United States Patent
Mochizuki

(10) Patent No.: US 10,430,809 B2
(45) Date of Patent: Oct. 1, 2019

(54) INFORMATION PROCESSING APPARATUS AND INFORMATION PROCESSING METHOD FOR MODIFYING A LIST ASSOCIATED WITH A USER

(71) Applicant: Rakuten, Inc., Tokyo (JP)

(72) Inventor: Daisuke Mochizuki, Tokyo (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 952 days.

(21) Appl. No.: 14/900,664

(22) PCT Filed: Jun. 28, 2013

(86) PCT No.: PCT/JP2013/067888
§ 371 (c)(1),
(2) Date: Dec. 22, 2015

(87) PCT Pub. No.: WO2014/207922
PCT Pub. Date: Dec. 31, 2014

(65) Prior Publication Data
US 2016/0148221 A1 May 26, 2016

(51) Int. Cl.
*G06Q 30/02* (2012.01)
*G06F 16/248* (2019.01)
(Continued)

(52) U.S. Cl.
CPC ....... *G06Q 30/0201* (2013.01); *G06F 16/215* (2019.01); *G06F 16/248* (2019.01); *G06F 16/9535* (2019.01); *G06Q 30/06* (2013.01)

(58) Field of Classification Search
CPC ............ G06Q 10/00–50/00; G06F 1/00–21/00
(Continued)

(56) References Cited

U.S. PATENT DOCUMENTS

| 6,438,579 B1 * | 8/2002 | Hosken | G06Q 30/02 709/203 |
| 7,113,917 B2 * | 9/2006 | Jacobi | G06Q 30/02 705/14.53 |

(Continued)

FOREIGN PATENT DOCUMENTS

| JP | 2008-140082 A | 6/2008 |
| JP | 2009-217636 A | 9/2009 |

(Continued)

OTHER PUBLICATIONS

International Search Report for PCT/JP2013/067888 dated Aug. 6, 2013.

*Primary Examiner* — Alan S Miller
(74) *Attorney, Agent, or Firm* — Sughrue Mion, PLLC

(57) ABSTRACT

An information processing apparatus obtains selection object identification information identifying a selection object to be added to a list and user identification information identifying a user who has performed an addition operation to the list. The information processing apparatus stores the selection object identification information and the user identification information in association with each other in storage means. The information processing apparatus retrieves specific information indicating a range including a selection object identified by the selection object identification information associated with the user identification information. The information processing apparatus controls modification of at least one of an excess and a deficiency of selection objects in the list, when the range of selection objects added to the list is determined to have converged based on the specific information.

12 Claims, 11 Drawing Sheets

(51) Int. Cl.
*G06F 16/9535* (2019.01)
*G06Q 30/06* (2012.01)
*G06F 16/215* (2019.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,194,477 | B1* | 3/2007 | Bradley | G06Q 30/02 |
| 7,315,834 | B2* | 1/2008 | Martineau | G06Q 30/06 |
| | | | | 705/26.61 |
| 7,356,490 | B1* | 4/2008 | Jacobi | G06Q 30/0601 |
| | | | | 705/26.8 |
| 7,720,723 | B2* | 5/2010 | Dicker | G06Q 30/02 |
| | | | | 705/14.51 |
| 7,831,548 | B1* | 11/2010 | Round | G06Q 30/0241 |
| | | | | 707/609 |
| 7,865,407 | B2* | 1/2011 | Kraft | G06Q 30/02 |
| | | | | 705/26.61 |
| 7,966,334 | B1* | 6/2011 | Bezos | G06Q 30/06 |
| | | | | 707/748 |
| 8,244,564 | B2* | 8/2012 | Selinger | G06Q 30/02 |
| | | | | 705/7.11 |
| 8,655,982 | B2* | 2/2014 | Yamahara | G06F 16/951 |
| | | | | 709/217 |
| 9,215,420 | B2* | 12/2015 | Suslov | H04N 7/173 |
| 9,224,167 | B2* | 12/2015 | Lampert | G06Q 30/0633 |
| 9,256,647 | B2* | 2/2016 | Umeda | G06F 16/24578 |
| 9,384,504 | B2* | 7/2016 | Lampert | G06Q 30/0625 |
| 2001/0021914 | A1* | 9/2001 | Jacobi | G06Q 30/02 |
| | | | | 705/14.53 |
| 2002/0072974 | A1* | 6/2002 | Pugliese, III | G06Q 30/02 |
| | | | | 705/14.16 |
| 2005/0177458 | A1* | 8/2005 | Martineau | G06Q 30/06 |
| | | | | 705/26.8 |
| 2008/0010657 | A1* | 1/2008 | Candelore | H04H 60/43 |
| | | | | 725/46 |
| 2009/0150214 | A1* | 6/2009 | Mohan | G06O 30/02 |
| | | | | 705/14.52 |
| 2010/0250336 | A1* | 9/2010 | Selinger | G06Q 30/02 |
| | | | | 705/26.7 |
| 2011/0296463 | A1* | 12/2011 | Suslov | H04N 7/173 |
| | | | | 725/44 |
| 2012/0041846 | A1* | 2/2012 | Rehman | G06Q 30/06 |
| | | | | 705/27.1 |
| 2012/0099756 | A1* | 4/2012 | Sherman | G06Q 30/06 |
| | | | | 382/100 |
| 2012/0239781 | A1* | 9/2012 | Yamahara | G06F 16/951 |
| | | | | 709/217 |
| 2012/0278127 | A1* | 11/2012 | Kirakosyan | G06Q 30/0631 |
| | | | | 705/7.29 |
| 2013/0218803 | A1* | 8/2013 | Whittle | G06Q 30/0282 |
| | | | | 705/347 |
| 2013/0325854 | A1* | 12/2013 | Umeda | G06F 26/24578 |
| | | | | 707/723 |
| 2014/0025532 | A1* | 1/2014 | Huang | G06Q 30/0631 |
| | | | | 705/26.7 |
| 2014/0279223 | A1* | 9/2014 | Lampert | G06Q 30/0625 |
| | | | | 705/26.35 |
| 2014/0280371 | A1* | 9/2014 | Bastide | G06F 16/35 |
| | | | | 707/803 |
| 2015/0012387 | A1* | 1/2015 | Katagiri | G06Q 30/02 |
| | | | | 705/26.64 |

FOREIGN PATENT DOCUMENTS

JP  2013-77107 A  4/2013
WO  2008/146456 A1  12/2008

* cited by examiner

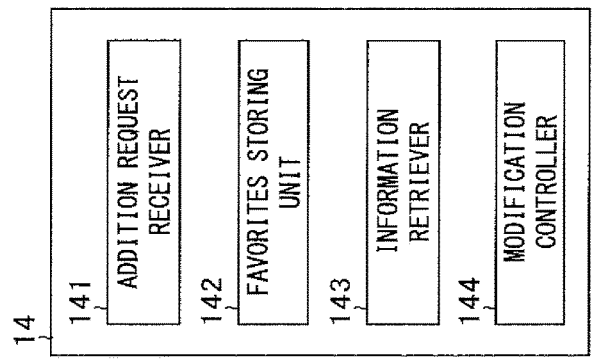
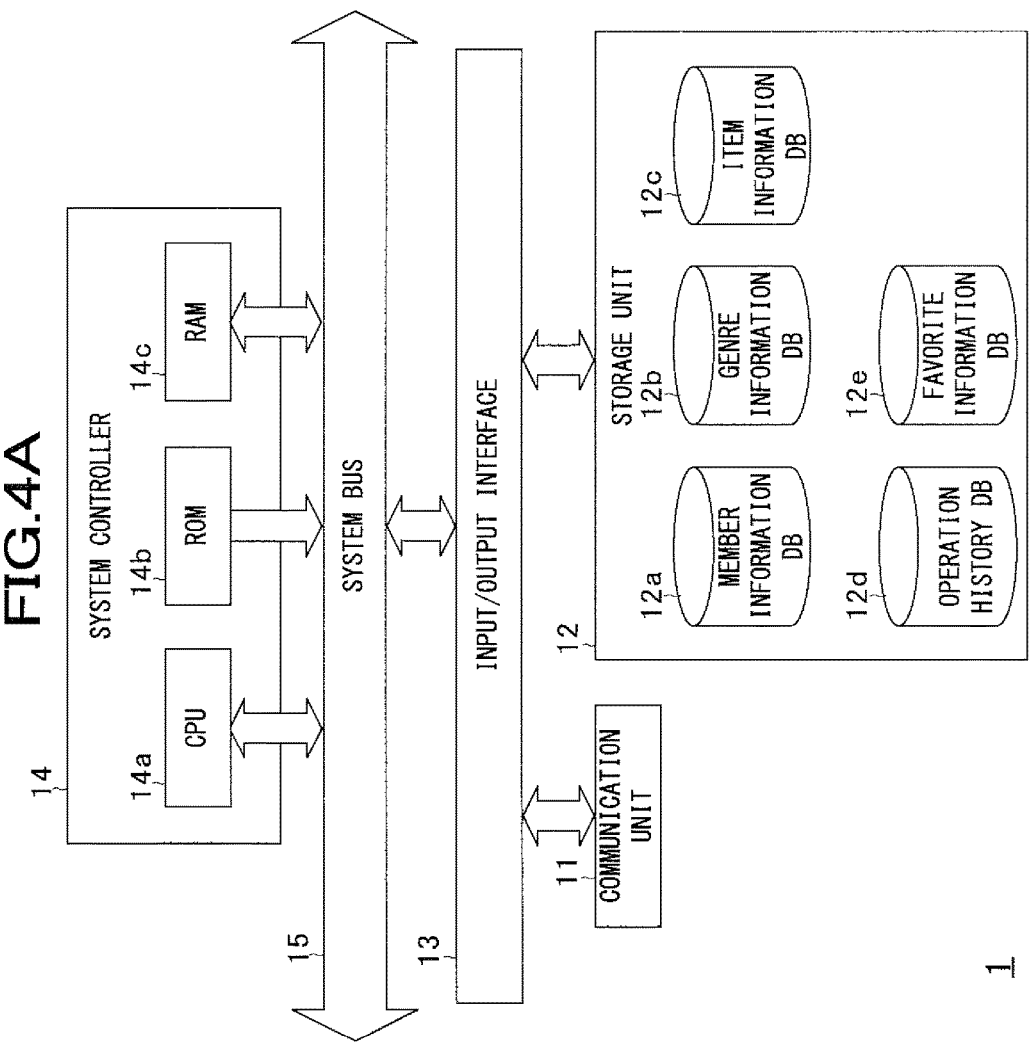

FIG.5A
MEMBER INFORMATION DB 12a

| |
|---|
| USER ID |
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |
| MODIFICATION CONTROL FLAG |
| . . . |

FIG.5B
GENRE INFORMATION DB 12b

| |
|---|
| GENRE ID |
| GENRE NAME |
| LEVEL |
| PARENT GENRE ID |
| CHILD GENRE ID LIST |

FIG.5C
ITEM INFORMATION DB 12c

| |
|---|
| STORE ID |
| ITEM ID |
| GENRE ID |
| ITEM NAME |
| ITEM IMAGE URL(S) |
| ITEM DESCRIPTION |
| ITEM PRICE |
| . . . |

FIG.5D
OPERATION HISTORY DB 12d

| |
|---|
| USER ID |
| OPERATION DATE AND TIME |
| URL |

FIG.5E
FAVORITE INFORMATION DB 12e

| |
|---|
| USER ID |
| ITEM ID |
| ADDED DATE AND TIME |
| SEARCH CRITERIA INFORMATION |

FIG.10

| | GENRE | | PRICE | |
|---|---|---|---|---|
| LOGIN | | | | |
| ADD ITEM G1 | X | | 5000 YEN → | DELETION CANDIDATE |
| ADD ITEM G2 | X | | 3000 YEN | |
| ADD ITEM G3 | Y → | DELETION CANDIDATE | 4000 YEN | |
| ADD ITEM G4 ⎫ | X | | 3000 YEN | |
| ADD ITEM G5 ⎬ CONVERGED | X | | 1000 YEN | |
| ADD ITEM G6 ⎭ | X | | 2000 YEN | |
| FAVORITES MODIFICATION CONTROL (DELETE ITEM G3) | | | | |
| VIEW ITEM G7 | X | | 4000 YEN | |
| VIEW ITEM G8 | X | | 2500 YEN | |
| VIEW ITEM G9 | X | | 3000 YEN | |
| ADD ITEM G9 | | | | |
| FAVORITES MODIFICATION CONTROL | | | RANGE OF DELETION CANDIDATES 4000 YEN OR MORE | |

REFERENCE DATE AND TIME (at ADD ITEM G3 / G4)

TIME ↓

INFORMATION PROCESSING APPARATUS AND INFORMATION PROCESSING METHOD FOR MODIFYING A LIST ASSOCIATED WITH A USER

CROSS REFERENCE TO RELATED APPLICATIONS

This application is a National Stage of International Application No. PCT/JP2013/067888 filed Jun. 28, 2013, the contents of which are incorporated herein by reference in their entirety.

TECHNICAL FIELD

The present invention relates to techniques for assisting in modifying a list that includes references to information about selected objects.

BACKGROUND ART

There are conventionally known techniques that enable a user to add, to a list, reference information to information about selection objects that interest the user and to easily access the information about the selection objects added to the list. For example, Patent Literature 1 discloses a technique that adds, to a list, an item selected by a member from an inventory as the member's favorite or an item to be purchased by the member and deletes, from the list, an item purchased by the member and items related to the item purchased by the member.

CITATION LIST

Patent Literature

Patent Literature 1: JP 2009-217636 A

SUMMARY OF INVENTION

Technical Problem

A user selects a selection object based on the user's own selection criterion when selecting the selection object and adding it to a list. In that case, the selection criterion may not be fully established at first and then may become established as the user selects one selection object after another. Thus, before the selection criterion has been fully established, the user may sometimes add, to the list, selection objects that would be unnecessary if the selection criterion were established, or may sometimes fail to add, to the list, selection objects that would be necessary if the selection criterion were established. Thus, to determine which selection object to purchase, the user has to review the selection objects added to the list and modify such an excess and a deficiency. In the technique described in Patent Literature 1, after an item is purchased, the item is deleted from the list. Thus, while the user is determining which item to purchase, neither an excess nor a deficiency of the items added to the list is modified.

In view of the above point, it is an object of the present invention to provide an information processing apparatus, an information processing method, and an information processing program that can modify at least one of an excess and a deficiency in addition of selection objects to a list before a criterion for selecting selection objects has been fully established.

Solution to Problem

To solve the above problem, the invention according to claim 1 includes identification information obtaining means, storage control means, specific information retrieval means, and modification control means. The identification information obtaining means obtains selection object identification information identifying a selection object to be added to a list that includes a reference to selection object information about the selection object, and user identification information identifying a user who has performed an addition operation to the list. The storage control means stores, in storage means, the selection object identification information and the user identification information obtained by the identification information obtaining means in association with each other. The specific information retrieval means retrieves specific information indicating a range including a selection object identified by the selection object identification information stored in the storage means in association with the user identification information obtained by the identification information obtaining means. When a range of selection objects added to the list is determined to have converged based on the specific information retrieved by the specific information retrieval means, the modification control means for controls modification of at least one of an excess and a deficiency of selection objects in the list in accordance with the condition that only selection objects included in a converged range are selection objects to be added to the list.

According to this invention, when the range of the selection objects added to the list has converged, at least one of the deletion control of selection object(s) not included in the converged range from the list and the addition control of selection object(s) included in the converged range to the list is performed. Thus, at least one of an excess and a deficiency in addition of selection objects to the list before a criterion for selecting selection objects has been fully established can be modified.

The invention according to claim 2 is the information processing apparatus according to claim 1 in which the specific information retrieval means may retrieve attribute information indicating an attribute of a selection object as the specific information, and if an attribute of one or more selection objects added to the list at or after a certain time, among a plurality of selection objects added to the list, is weighted in part of an attribute range of the plurality of selection objects, the modification control means may determine that attributes of the selection objects added to the list has converged.

According to this invention, when the attribute of the selection object(s) added to the list at or after a certain time is weighted in part of the attribute range of the selection objects added to the list before, it is determined that the attribute of the selection objects added to the list has converged. Thus, whether the user's selection criterion has been established can be properly determined.

The invention according to claim 3 is the information processing apparatus according to claim 1 or 2 in which the modification control means may cause a selection object not included in the converged range, among the selection object identified by the selection object identification information stored in the storage means, to be presented as a deletion candidate from the list.

According to this invention, a selection object that is unlikely to match the current criterion, among the selection objects added to the list before the selection criterion has been fully established, can be presented.

The invention according to claim 4 is the information processing apparatus according to any one of claims 1 to 3 in which the modification control means may cause a selection object that is different from the selection object identified by the selection object identification information stored in the storage means and that is included in the converged range among selection objects for which at least part of information included in the selection object information has been displayed, to be presented as an addition candidate to the list.

According to this invention, a selection object that is likely to match the current criterion, among the selection objects not added to the list before the selection criterion has been fully established, can be presented.

The invention according to claim 5 is the information processing apparatus according to claim 4 in which the modification control means may cause only a selection object for which the selection object information has been accessed by the user to be presented as the addition candidate to the list.

According to this invention, a selection object that the user accessed the selection object information and decided not to add to the list before the selection criterion has been fully established can be presented. Thus, after the selection criterion has been fully established, a selection object that the user is likely to search for in order to add to the list can be presented.

The invention according to claim 6 is the information processing apparatus according to any one of claims 1 to 5 that may further include attribute information retrieval means, identifying means, and deletion control means. The attribute information retrieval means retrieves attribute information that is different from the specific information retrieved by the specific information retrieval means and that indicates an attribute of the selection object identified by the selection object identification information stored in the storage means by the storage control means after the range of the selection objects added to the list has converged, and attribute information that indicates an attribute of selection objects corresponding to the selection object information accessed after the range of the selection objects added to the list has converged. The identifying means identifies a range that is within an attribute range of selection objects not added to the list among the selection objects corresponding to the accessed selection object information and that does not overlap with an attribute range of the selection objects added to the list, based on the attribute information retrieved by the attribute information retrieval means. The deletion control means controls deletion of a selection object whose attribute is included in the range identified by the identifying means from the list.

According to this invention, for the selection objects not added to the list among the selection objects corresponding to the selection object information accessed after the range of the selection objects added to the list has converged, the range of the attribute indicated by the attribute information different from the specific information can be identified so as not to overlap with the range of the selection objects added to the list. The deletion control of a selection object whose attribute is included in the identified range from the list is then performed. Thus, when the user has a plurality of selection criteria, a selection object that does not match the plurality of selection criteria can be deleted from the list.

The invention according to claim 7 is an information processing method performed by a computer. The method includes the following steps. Selection object identification information identifying a selection object to be added to a list for including a reference to selection object information about the selection object, and user identification information identifying a user who has performed an addition operation to the list are obtained. The obtained selection object identification information and the obtained user identification information are stored in association with each other in storage means. Specific information indicating a range including a selection object identified by the selection object identification information stored in the storage means in association with the obtained user identification information is retrieved. When a range of selection objects added to the list is determined to have converged based on the retrieved specific information, modification of at least one of an excess and a deficiency of selection objects in the list is controlled in accordance with the condition that only selection objects included in a converged range are selection objects to be added to the list.

The invention according to claim 8 causes a computer to function as identification information, storage control means, specific information retrieval means, and modification control means. The identification information obtaining means obtains selection object identification information identifying a selection object to be added to a list for including a reference to selection object information about the selection object, and user identification information identifying a user who has performed an addition operation to the list. The storage control means stores, in storage means, the selection object identification information and the user identification information obtained by the identification information obtaining means in association with each other. The specific information retrieval means retrieves specific information indicating a range including a selection object identified by the selection object identification information stored in the storage means in association with the user identification information obtained by the identification information obtaining means. When a range of selection objects added to the list is determined to have converged based on the specific information retrieved by the specific information retrieval means, the modification control means controls modification of at least one of an excess and a deficiency of selection objects in the list in accordance with the condition that only selection objects included in a converged range are selection objects to be added to the list.

Advantageous Effects of Invention

According to the present invention, when the range of the selection objects added to the list has converged, at least one of the deletion control of selection object(s) not included in the converged range from the list and the addition control of selection object(s) included in the converged range to the list is performed. Thus, at least one of an excess and a deficiency in addition of selection objects to the list before a criterion for selecting selection objects has been fully established can be modified.

BRIEF DESCRIPTION OF DRAWINGS

FIG. 4A is a block diagram schematically showing an example configuration of an online marketplace server 1 according to an embodiment.

FIG. 4B is a diagram showing example functional blocks of the online marketplace server 1 according to an embodiment.

FIG. 5A is a diagram showing example contents stored in a member information DB 12*a*.

FIG. 5B is a diagram showing example contents stored in a genre information DB 12*b*.

FIG. 5C is a diagram showing example contents stored in an item information DB 12*c*.

FIG. 5D is a diagram showing example contents stored in an operation history DB 12*d*.

FIG. 5E is a diagram showing example contents stored in a favorite information DB 12*e*.

FIG. 10 is a diagram showing an example of how to determine deletion candidates.

DESCRIPTION OF EMBODIMENTS

The following describes embodiments of the present invention in detail with reference to the drawings. In the embodiments described below, the present invention is applied to an information providing system.

Figure 1:
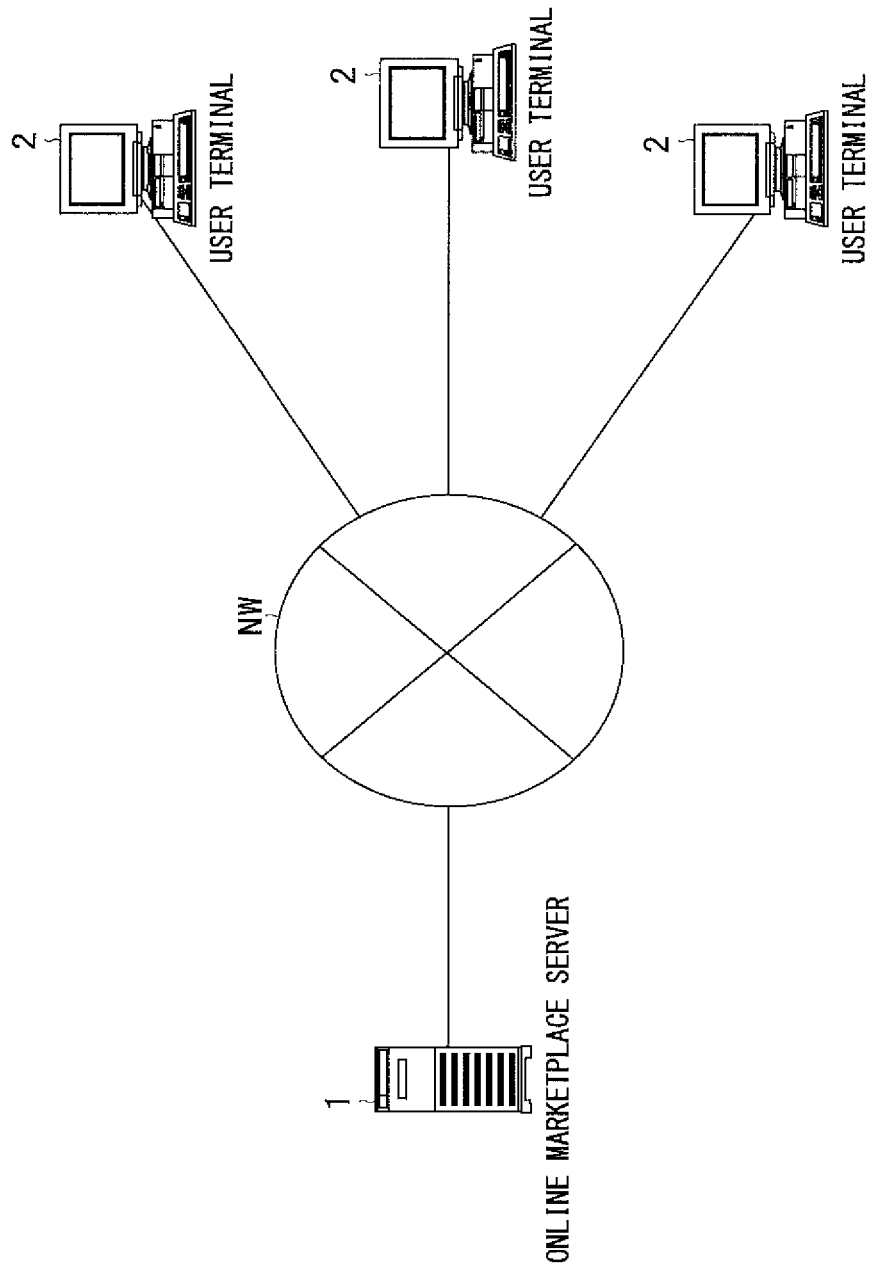
FIG. 1 is a diagram schematically showing an example configuration of an information providing system S according to an embodiment.

1. First Embodiment 1-1. Configuration and Functional Overview of Information Providing System A configuration of an information providing system S according to this embodiment is first described with reference to FIG. 1. FIG. 1 is a diagram schematically showing an example configuration of the information providing system S according to this embodiment.

As shown in FIG. 1, the information providing system S includes an online marketplace server 1 and a plurality of user terminals 2. The online marketplace server 1 can exchange data with each user terminal 2 via a network NW using communication protocols, such as TCP/IP. The network NW includes, for example, the Internet, a dedicated communication line (e.g., community antenna television (CATV) line), a mobile communication network (including base stations), and a gateway.

The online marketplace server 1 is a server device that performs various processes related to an online marketplace in which items can be purchased. The online marketplace server 1 is an example of an information processing apparatus according to the present invention. Users can purchase any desired item from any desired store in the online marketplace. For example, the online marketplace server 1 sends web pages of the online marketplace and performs processes related to item searches and purchases in response to requests from the user terminals 2. An item is an example of a selection object of the present invention.

The user terminal 2 is a terminal device of a user who uses the online marketplace. The user terminal 2 accesses the online marketplace server 1 in accordance with an operation by the user to receive a web page from the online marketplace server 1 and displays the web page. The user terminal 2 has software, such as a browser and an e-mail client, installed on it. For example, a personal computer, a personal digital assistant (PDA), a portable information terminal such as a smartphone, or a mobile phone is used as the user terminal 2.

A user can specify a search criterion to search for items that can be purchase candidates in the online marketplace. As the search criterion, for example, a keyword or an item genre can be specified. When a search criterion is specified, the online marketplace server 1 searches for items that meet the search criterion. Specifically, the online marketplace server 1 searches for items whose name, description, or the like includes a specified keyword. Alternatively, the online marketplace server 1 searches for items that belong to a specified genre. When a plurality of search criteria are specified, the online marketplace server 1 searches for, for example, items that meet all the search criteria. Then, a search results page is displayed on the screen of the user terminal 2.

The search results page is a web page that displays a list of found items. For example, the search results page displays, for each item, the item's name, image, price, and a store name. The information displayed on the search results page is an example of part of selection object information of the present invention. The hyperlinks (hereinafter simply "links") to item pages for the found items are embedded in the search results page. If the user selects a link for any item on the search results page, the corresponding item page is displayed on the screen of the user terminal 2. The item page is a web page that displays information about the selected item. The item page displays more detailed information than the information that is displayed on the search results page. For example, the item page displays the item's name, images, price, a store name, a description of the item, payment methods, shipping methods, and matters to be attended to. The information displayed on the item page is an example of the selection object information of the present invention. A purchase operation on the item page enables the user to purchase the item corresponding to the item page.

The online marketplace provides a favorites function. The favorites function is a function that registers some items being sold in the online marketplace as a user's favorites so that the references to the corresponding item pages are stored in the user's own list and allows the user to easily access the item pages for the items favorited by the user. In the online marketplace, each item page displays a link indicated as "Add to Favorites". When a user selects this link, the item whose information is displayed on the item page is added to the user's favorites.

The user can see what items have been added to the favorites on a favorites page. The favorites page is a web page that displays a list of the items added to the favorites. If the user selects a link for any item on the favorites page, the corresponding item page can be displayed. On the favorites page, the user can delete, from the favorites, an unnecessary item among the items added to the favorites.

The use of the favorites function enables the user to register, for example, items that interest the user and items selected as purchase candidates. The user can select an item to purchase from among the items added to the favorites. However, when the user searches for items and selects which item to add to the favorites, the user's criterion for selecting items may not be fully established at first. For example, the user may roughly determine the criterion at first or sometimes waver in the criterion as the user selects one item after another. After that, as the number of times that the user selects an item to add to the favorites increases, the criterion for selecting items may become established. Some items that do not match the current criterion may be included among the items added to the favorites before the criterion has been fully established. That is, some items unnecessary for the user may have been redundantly added to the favorites. In this case, information about the unnecessary items, which is displayed on the favorites page, makes it difficult for the user to select an item that matches the criterion from the favorites page. On the other hand, some items that match the current criteria may be excluded from the items added to the favorites before the criterion has been fully established. That is, the favorites may lack some necessary items. Thus, there may be an excess and a deficiency of the items added to the favorites. To resolve such an excess and a deficiency, the user has to find out the unnecessary items from the favorites page and delete them. The user also has to add the items that match the criterion to the favorites, for example, by searching again or checking the user's item page view history. In these ways, it takes the user time and effort to modify the favorites.

To solve this problem, the online marketplace server 1 controls modification of an excess and a deficiency of the items added to the favorites. Specifically, the online marketplace server 1 determines whether the range of the items added to the favorites has converged. The range of the items added when the criterion is clear is narrower than the range of the item added before the criterion has been fully established. For example, when the criterion changes from rough to clear, the range of the items converges. Also when the user clearly selects one criterion from among a plurality of shaken criteria, the range of the items converges. When the online marketplace server 1 determines that the range of the items added to the favorites has converged, the online marketplace server 1 determines the converged range as the range of items to add to the favorites. Then, the online marketplace server 1 controls the modification in accordance with the condition that only the items included in the converged range are items to be added to the favorites. More specifically, the online marketplace server 1 determines item(s) not included in the converged range, among the items added to the favorites, as candidate(s) to delete from the favorites. The online marketplace server 1 also determines item(s) included in the converged range, among items not added to the favorites, as candidate(s) to add to the favorites. For example, the online marketplace server 1 may determine deletion candidate(s) or addition candidate(s) but not both, and then control deletion from the favorites or addition to the favorites but not both. That is, the online marketplace server 1 may modify a deficiency of the items added to the favorites or an excess of the items added to the favorites but not both.

As information identifying the range of the items, for example, an attribute of the items may be used. Examples of the attribute of the items include item genre, price, specification, functions, performance, capacity, size, and weight. When the attribute of items added at or after a certain time, among the items added before, is weighted in a specific attribute range, the online marketplace server 1 determines that the attribute of the items has converged.

In this embodiment, genre is used. The genre of items is hierarchically defined to have a tree structure. Specifically, each node of the tree structure corresponds to a genre. The depth of a node corresponds to the level (layer) of the genre corresponding to the node. The depth of a node is the distance from the node at the root (hereinafter simply the "root node"). The larger the value of the level is, the deeper the depth of the level is. The smaller the value of the level is, the shallower the depth of the level is. Genres corresponding to child nodes that the root node has are Level 1 genres. The Level 1 genres are the top level genres. In each of the Level 1 genres, genres corresponding to its child nodes are defined as Level 2 genres. Here, a genre C2 corresponding to a child node of a genre C1 is referred to as a child genre of the genre C1. The genre C1 here is referred to as the parent genre of the genre C2. Child genres are a plurality of subgenres into which a parent genre is further divided and are each a range to which similar items belong. Thus, the child genres belong to the parent genre. When a genre C3 is a child node of the genre C2, the genre C3 is referred to as a descendant genre of the genre C1. The genre C1 is referred to as an ancestor genre of the genre C3. The descendant genre belongs to the ancestor genre. Examples of the Level 1 genres include "men's fashion", "ladies fashion", and "shoes". Examples of child genres of "shoes" include "ladies shoes" and "men's shoes". Examples of child genres of "men's shoes" include "sneakers", "business shoes", and "boots".

Figure 2:
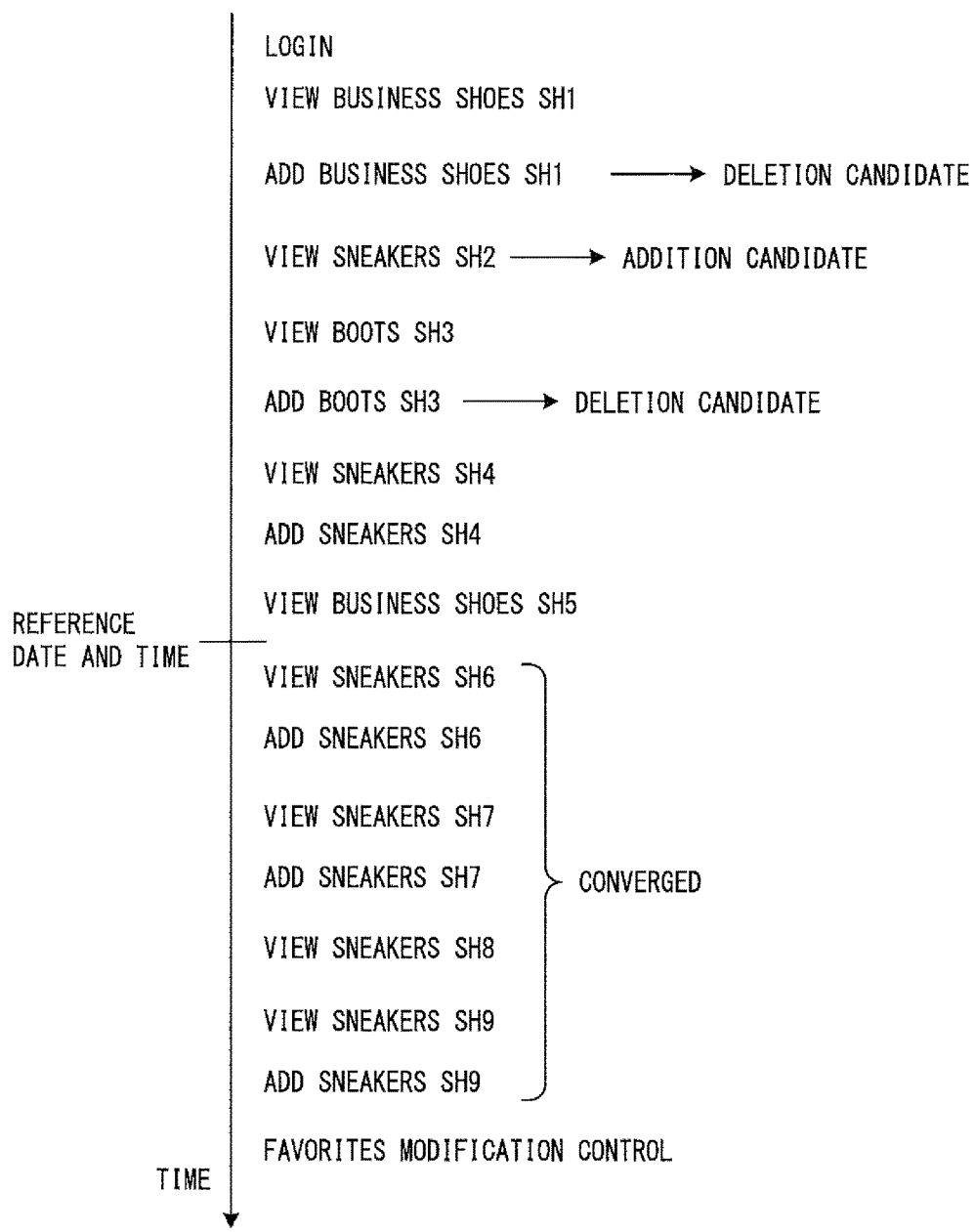
FIG. 2 is a diagram showing an example of how to determine deletion candidates and addition candidates.

FIG. 2 is a diagram showing an example of how to determine deletion candidates and addition candidates. As shown in FIG. 2, after logging in to the online marketplace, a user views an item page for business shoes SH1 and then adds the business shoes SH1 to the user's favorites. Subsequently, the user views an item page for sneakers SH2, but does not add the sneakers SH2 to the favorites. Then, the user views an item page for boots SH3, and adds the boots SH3 to the favorites. Next, the user views an item page for sneakers SH4, and adds the sneakers SH4 to the favorites. Then, the user views an item page for business shoes SH5, but does not add the business shoes SH5 to the favorites. In this way, the user's item selection criterion has not yet been established. The criterion may have wavered among "business shoes", "boots", and "sneakers". The criterion of "men's shoes" may have been roughly established.

After that, the user views an item page for sneakers SH6, and adds the sneakers SH6 to the favorites. Subsequently, the user views an item page for sneakers SH7, and adds the sneakers SH7 to the favorites. Then, the user views an item page for sneakers SH8, but does not add the sneakers SH8 to the favorites. Next, the user views an item page for sneakers SH9, and adds the sneakers SH9 to the favorites. Thus, the genre of the items added to the favorites has converged to "sneakers".

Then, the online marketplace server 1 controls modification of the favorites. Specifically, the online marketplace server 1 determines the business shoes SH1 and the boots SH3 as deletion candidates and determines the sneakers SH2 as an addition candidate. Here, the online marketplace server 1 may exclude the sneakers SH8 from an addition candidate. The reason is that the item not added to the favorites while the range of the items added to the favorites has converged is an item that the user did not add to the favorites based on the user's clear item selection criterion. For example, the online marketplace server 1 may determine the period up to now from an item was added to the favorites for the first time since a reference date and time as the period during which the range of the items added to the favorites has converged. Alternatively, the online marketplace server 1 may determine the sneakers SH8 as an addition candidate. In the example of FIG. 2, the items added to the favorites after the reference date and time are all "sneakers", and thus it is determined that the range of the items added to the favorites has converged. However, if the genre is common among more than a predetermined percentage of the items added to the favorites, the online marketplace server 1 may determine that the range of the item has converged. In this case, while the range of the items added to the favorites has converged, an item not included in the converged range may have been added to the favorites. In this case, the online marketplace server 1 may determine this item as a deletion candidate or may exclude this item from a deletion candidate.

For example, after partially determining the item selection criterion, the user logs in to the online marketplace and searches for items. Alternatively, after logging in to the online marketplace, the user partially determines the selection criterion. Thus, for example, as shown in FIG. 2, the online marketplace server 1 may determine whether the range of the items added to the favorites has converged, based on the items added to the favorites after the user's last login. To determine whether the range of the items added to the favorites has converged, the online marketplace server 1 needs to divide a period during which the range of the items added to the favorites may not have converged from a period during which the range of the items added to the favorites may have converged. The boundary between these periods is referred to as the reference date and time. For example, the percentage of the period during which the range of the items may have converged may be preset. This percentage is referred to as a convergence period percentage. The convergence period percentage may be, for example, 50%. The online marketplace server 1 may determine the reference date and time based on the length of time from the user's last login to the present and the convergence period percentage. Alternatively, the online marketplace server 1 may determine the reference date and time based on the time taken to browse item pages. The reason is that the less sufficient the item selection criterion is, the more likely the user is to wonder whether to add the items corresponding to item pages. That is, the clearer the item selection criterion is, the less time it takes to browse item pages. Thus, the online marketplace server 1 may determine the reference date and time, for example, so that the reference date and time divides a period during which the browsing time tends to be longer than a predetermined time from a period during which the browsing time tends to be shorter than the predetermined time.

If the online marketplace server 1 determines that the range of the items has not yet converged since the reference date and time, the online marketplace server 1 may change the reference date and time. Then, the online marketplace server 1 may determine whether the range of the items added to the favorites has converged, based on the post-change reference date and time. In this case, for example, the post-change reference date and time only needs to be later than the pre-change reference date and time. For example, if the online marketplace server 1 determines that the range of the items has not converged based on the reference date and time determined by using the convergence period percentage (referred to as a first convergence period percentage), the online marketplace server 1 may change the reference date and time using a second convergence period percentage. In this case, the first and second convergence period percentages may be preset so that the second convergence period percentage is less than the first convergence period percentage.

In the example of FIG. 2, the items added to the favorites are all "men's shoes". The level of the genre "men's shoes" is 2. On the other hand, the level of the genre "sneakers" is 3. The genre of the items added to the favorites needs to have a certain level of depth in order to be determined to have converged. The reason is that the deeper the level of the genre is, the narrower the range covered by the genre becomes. In the example of FIG. 2, it is not determined that the genre has converged even by the fact that some items belonging to "men's shoes" have been added. A level used to determine whether the genre has converged is referred to as a convergence condition level. What the genre has converged to is referred to as a converged genre. In the example of FIG. 2, the convergence condition level is Level 3, and the converged genre is "sneakers".

From when the criterion for selecting items is not fully established to when the criterion is clear, the items added to the favorites are required to share a certain degree of common genres. A genre common to all is referred to as a universal genre. For example, assume that the user adds an item, shoes, and another item, drinking water, to the favorites at a certain time. There is no relationship between the shoes and the drinking water. In this case, the user may probably add the shoes and the drinking water to the favorites to purchase both of the items. That is, the user is unlikely to wonder which to purchase, the shoes or the drinking water. A level used to determine whether the items added to the favorites have a genre common to all is referred to as a universal condition level. In the example of FIG. 2, the universal condition level is Level 2, and the universal genre is "men's shoes". For example, the convergence condition level and the universal condition level are preset. Alternatively, the convergence condition level and the universal condition level may be set for each genre at Level 1. In order for the genre of the items that the user adds to the favorites to be determined to have converged, the converged genre needs to belong to the universal genre. As long as the requirement that the converged genre belongs to the universal genre is met, the difference between the convergence condition level and the universal condition level may be any number of levels.

When an attribute other than genre is used as information identifying the range of the items, any attribute that is hierarchically defined can be processed like genre. For an attribute expressed by numerical values, the online marketplace server 1 may determine the range of the attribute values of the items added from the last login the present, for example, based on the minimum and maximum of the attribute values of all the items added before. This range is referred to as a universal range. The universal range may range from the minimum value to the maximum value. Alternatively, the universal range may range, for example, from a round attribute value close to the minimum value to another round attribute value close to the maximum value. The online marketplace server 1 has to determine whether the attribute has converged. For example, if the difference between the maximum and the minimum of the attribute values of the items added at or after the reference date and time is less than or equal to a predetermined value, the online marketplace server 1 may determine that the attribute has converged. Alternatively, for example, if the difference between the maximum and the minimum of the attribute values of the items added at or after the reference date and time is less than or equal to a predetermined percentage of the universal range, the online marketplace server 1 may determine that the attribute has converged.

In the example of FIG. 2, the item corresponding to a viewed item page is determined as an addition candidate. The reason is that the user probably remembers the item which the user accessed the information about but did not add to the favorites and that the user is likely to search for the item in order to add the item, which the user remembers, to the favorites. On the contrary, the online marketplace server 1 may determine, as an addition candidate, the item corresponding to an item page not yet viewed. For example, the online marketplace server 1 may determine, as addition candidate(s), item(s) not added to the favorites among items listed on a search results page by the user terminal 2.

Figure 3:
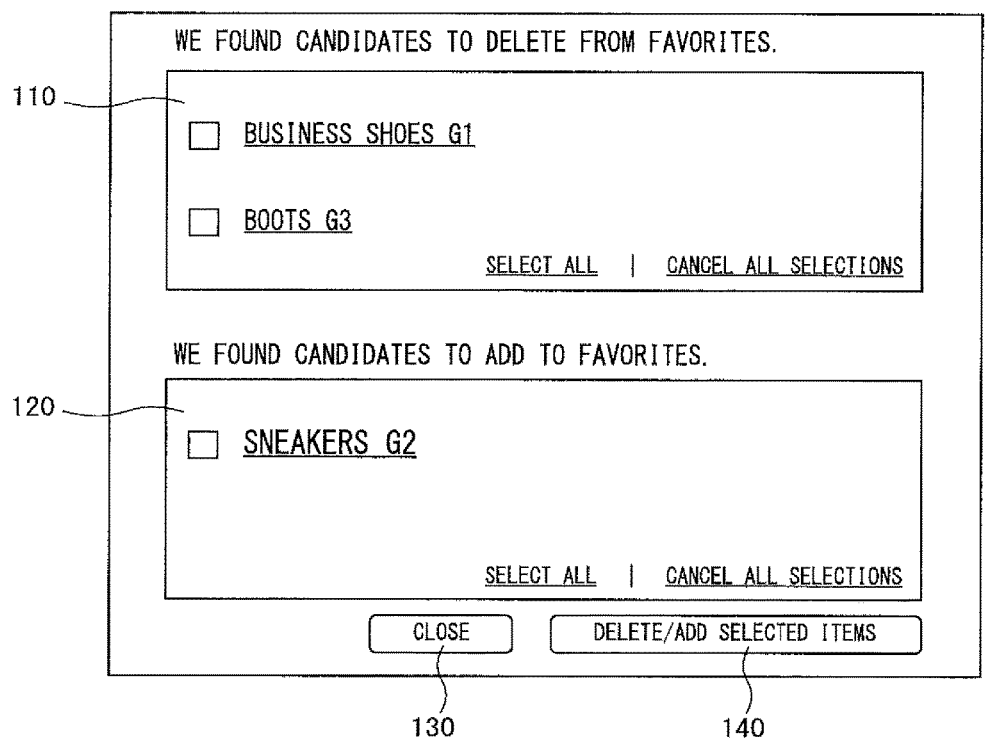
FIG. 3 is a diagram showing an example display of a favorites modification confirmation page.

After determining deletion candidate(s) and addition candidate(s), the online marketplace server 1 may cause the user terminal 2 to present the deletion candidate(s) and the addition candidate(s) to the user. Then, in response to the user's selection, the deletion candidate(s) may be deleted from the favorites, and the addition candidate(s) may be added to the favorites. FIG. 3 is a diagram showing an example display of a favorites modification confirmation page. The favorites modification confirmation page displays deletion candidate(s) and addition candidate(s). The favorites modification confirmation page is a web page for assisting in modifying the favorites.

As shown in FIG. 3, the favorites modification confirmation page displays, for example, a deletion candidate area 110, an addition candidate area 120, a close button 130, and a modification button 140. In the deletion candidate area 110, a list of the items determined as the deletion candidates is displayed. Specifically, the item names of the deletion candidates are displayed in the deletion candidate area 110. The item names are texts linked to item pages for the items determined as the deletion candidates. If the user selects any item name, the user can see information about the item determined as a deletion candidate. For each of the item names, a check box for selecting whether to delete the corresponding item from the favorites is also displayed in the deletion candidate area 110. Links for selecting or clearing the check boxes for all the items are also displayed in the deletion candidate area 110. In the addition candidate area 120, a list of the items determined as the addition candidate is displayed. Except for this respect, contents displayed in the addition candidate area 120 are essentially the same as the contents displayed in the deletion candidate area 110. If there are no deletion candidates, the deletion candidate area 110 is not displayed. If there are no addition candidates, the addition candidate area 120 is not displayed. The close button 130 is a button for clearing the favorites modification confirmation page from the screen without modifying the favorites. The modification button 140 is a button for performing modification of the favorites. When the modification button 140 is selected, the online marketplace server 1 deletes the item(s) selected in the deletion candidate area 110 from the favorites and adds the item(s) selected in the addition candidate area 120 to the favorites.

Alternatively, the deletion candidates and the addition candidates may be presented to the user by a method other than displaying web pages. For example, the online marketplace server 1 may be configured so that a pop-up window containing display contents similar to the display contents shown in FIG. 3 is displayed by the user terminal 2. Also for example, the online marketplace server 1 may generate an e-mail containing a list of the deletion candidates and the addition candidates in its body and send the generated e-mail to the user. In this case, in response to the user's operation, the user terminal 2 receives the e-mail and displays it on the screen. In the body of the e-mail, for example, the names of the items determined as the deletion candidates and the addition candidates are written line by line. The user replies to the received e-mail. At this time, the user causes a screen for composing a reply e-mail to appear so that the body of the received e-mail is quoted in it. Subsequently, in the body of the reply e-mail, the user adds character(s) which indicate deletion, such as "delete" or "X", to the line where the name and other information of an item to delete from the favorites is written. The user also adds character(s) which indicate addition, such as "add" or "O", in the line where the name and other information of an item to add to the favorites is written. Then, the user performs a sending operation to send the reply e-mail from the user terminal 2 to the online marketplace server 1. The online marketplace server 1 modifies the favorites based on the body of the received reply e-mail.

Alternatively, after the deletion candidates and the addition candidates are determined, the online marketplace server 1 may perform modification of the favorites, for example, without presentation of the deletion candidates and the addition candidates. Then, for example, the online marketplace server 1 may cause the result of the modification to be presented to the user.

1-2. Configuration of Online Marketplace Server

The following describes a configuration of the online marketplace server 1 with reference to FIGS. 4A to 5E.

FIG. 4A is a block diagram schematically showing an example configuration of the online marketplace server 1 according to an embodiment. As shown in FIG. 4A, the online marketplace server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with, for example, the user terminal 2.

The storage unit 12 includes, for example, hard disk drives. The storage unit 12 is an example of storage means of the present invention. In this storage unit 12, a member information DB 12*a*, a genre information DB 12*b*, an item information DB 12*c*, an operation history DB 12*d*, and a favorite information DB 12*e*, and other databases have been created. "DB" is an abbreviation for "database".

FIG. 5A is a diagram showing example contents stored in the member information DB 12*a*. The member information DB 12*a* stores member information about users who have signed up for the information providing system S. Specifically, the member information DB 12*a* stores, in association with each user, the user's user ID, password, nickname, name, birth date, gender, zip code, address, telephone number, e-mail address, a modification control flag, and other user attributes. The user ID is identification information of the user. The modification control flag indicate whether the modification control of the favorites was performed after logging in to the online marketplace. The modification control flag set to FALSE indicates that the modification control has not yet been performed. The modification control flag set to TRUE indicates that the modification control was performed. For example, when the user logs in to the online marketplace, the modification control flag is reset to FALSE.

FIG. 5B is a diagram showing example contents stored in the genre information DB 12*b*. The genre information DB 12*b* stores genre information about item genres. Specifically, the genre information DB 12*b* stores, in association with each genre, the genre's genre ID, genre name, level, parent genre ID, child genre ID list, and other attributes. The genre information is set, for example, by an administrator of the online marketplace. The genre ID is identification information of the genre defined by the genre information. The genre ID is an example of specific information of the present invention. The parent genre ID is the genre ID of the parent genre of the genre defined by the genre information. The child genre ID list is a list of the child genres of the genre defined by the genre information. The child genre ID list is set when the genre defined by the genre information has child genres.

FIG. 5C is a diagram showing example contents stored in the item information DB 12c. The item information DB 12c stores item information about items being sold in the online marketplace. Specifically, the item information DB 12c stores, in association with each item that each store sells, a store ID, the item's item ID, genre ID, name, the URL(s) of item image(s), the item's description, price, and other attributes. The item ID is identification information of the item and is used for the store to manage the item for sale. The item ID is an example of information indicating a selection object. The store ID indicates a store that sells the item. The genre ID is the genre ID of a genre to which the item belongs. Basically, the genre ID of a genre defined at the lowest level (a genre corresponding to a leaf node in the tree structure) is set. That is, each item is classified in a most detailed genre.

FIG. 5D is a diagram showing example contents stored in the operation history DB 12d. The operation history DB 12d stores users' operation logs in the online marketplace. Specifically, the operation history DB 12d stores, for example, a user ID, operation date and time, and a URL. An operation log is stored every time the online marketplace server 1 receives a request sent from the user terminal 2 in response to a user's operation. Each user ID indicates a user who performed an operation. The operation date and time indicates the date and time when the operation was performed. The URL is the URL set in the request sent from the user terminal 2. The online marketplace server 1 can identify, for example, the operation performed by the user and the item ID of the target item of the operation, from the URL set in the request. Examples of the user operation include a login operation, a logout operation, an item search operation, and a web page display operation. An operation log indicating an operation to display an item page is referred to as an item page view log. An operation log indicating an item search operation is referred to as a search log.

FIG. 5E is a diagram showing example contents stored in the favorite information DB 12e. The favorite information DB 12e stores favorite information about users' favorites. Specifically, every time an item is added to a user's favorites, the user's user ID, the item's item ID, the added date and time, search criteria information, and other information are stored in association with each other, in the favorite information DB 12e. The user ID indicates the user who added the item to the favorites. The item ID indicates the item added to the favorites. The item ID is information corresponding to the reference to an item page for the item added to the favorites. Information about the actual reference to the item page is the URL, but the URL of the item page can be identified from the item ID. The URL of the item page may be stored in the favorite information DB 12e together with the item ID or in place of the item ID. The added date and time indicates the date and time when the addition to the favorites was performed. The search criteria information indicates the search criteria specified by the user when the user searched for the item added to the favorites. When storing favorite information, for example, the system controller 14 searches the operation history DB 12d for the latest search log. Then, the system controller 14 obtains search criteria information from the URL of the retrieved search log and stores favorite information including the obtained search criteria information.

The following describes other information stored in the storage unit 12. The storage unit 12 stores various data, such as hypertext markup language (HTML) documents, extensible markup language (XML) documents, image data, text data, and electronic documents, for displaying web pages.

The storage unit 12 also stores various programs, such as an operating system, a World Wide Web (WWW) server program, a database management system (DBMS), and an e-commerce management program. The e-commerce management program is a program for performing various processes related to e-commerce. The e-commerce management program includes a program for performing the favorites modification control. The e-commerce management program is an example of an information processing program according to the present invention. The various programs may be available from, for example, another server device via the network NW, or may be recorded in a recording medium, such as a digital versatile disc (DVD), and be read via a drive device. The e-commerce management program may be a program product.

The input/output interface 13 performs interface processing between the communication unit 11 and the storage unit 12, and the system controller 14.

The system controller 14 includes, for example, a CPU 14a, a read only memory (ROM) 14b, and a random access memory (RAM) 14c. FIG. 4B is a diagram showing example functional blocks of the online marketplace server 1 according to this embodiment. The e-commerce management program and other programs, which are read and executed by the CPU 14a, enable the system controller 14 to function as, for example, an addition request receiver 141, a favorites storing unit 142, and an information retriever 143, and a modification controller 144 of the present invention. The addition request receiver 141 is an example of identification information obtaining means of the present invention. The favorites storing unit 142 is an example of storage control means of the present invention. The information retriever 143 is an example of specific information retrieval means and attribute information retrieval means of the present invention. The modification controller 144 is an example of modification control means, identifying means, and deletion control means of the present invention.

The addition request receiver 141 receives an add-to-favorites request sent from the user terminal 2 to the online marketplace server 1 via the communication unit 11. The add-to-favorites request is a message indicating a request to add an item to the favorites. The add-to-favorites request includes a user ID and an item ID. The user ID indicates the user who made the request. The item ID indicates the item to be added to the favorites. The favorites storing unit 142 stores favorite information in the favorite information DB 12e, based on the add-to-favorites request received by the addition request receiver 141. The information retriever 143 retrieves, from the favorite information DB 12e, one or more pieces of favorite information corresponding to the user ID included in the add-to-favorites request received by the addition request receiver 141. The information retriever 143 retrieves, from the item information DB 12c, the genre ID(s) corresponding to the item ID(s) included in the retrieved piece(s) of favorite information. The modification controller 144 determines whether the range of items added to the favorites has converged, based on the genre ID(s) retrieved by the information retriever 143. If the modification controller 144 determines that the range of the items added to the favorites has converged, the modification controller 144 modifies at least one of an excess and a deficiency of the items added to the favorites. Detailed processes in these units are described below.

The online marketplace server 1 may include a plurality of server devices. For example, a server device that performs the favorites modification control, a server device that handles item searches and orders in the online marketplace, a server device that sends web pages in response to requests from the user terminals 2, a server device that manages the databases, and other server devices may be connected to each other via a LAN or the like.

1-3. Operation of Information Providing System

Figure 6:
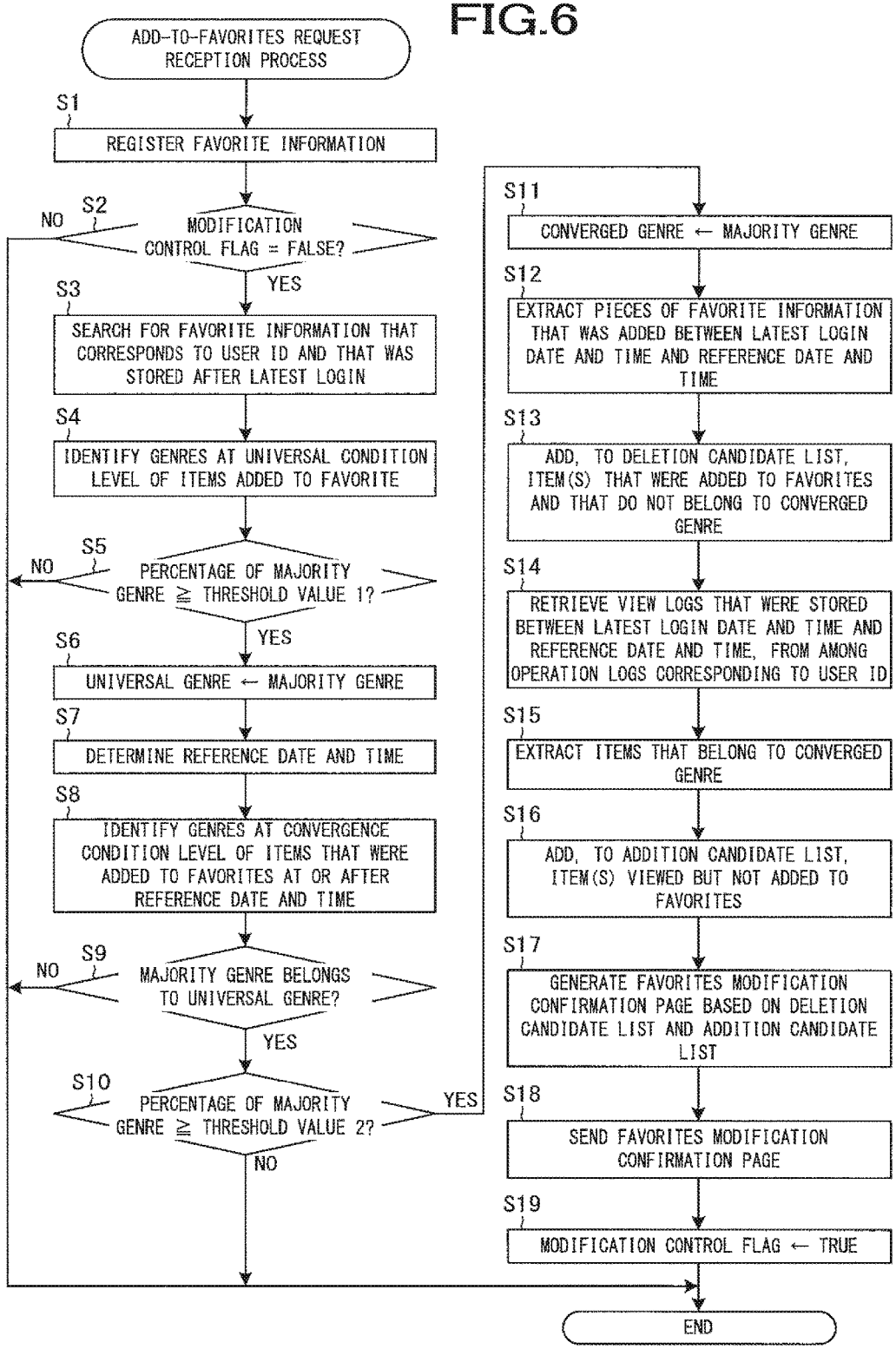
FIG. 6 is a flowchart showing an example process of an add-to-favorites request reception process in the system controller 14 of the online marketplace server 1 according to an embodiment.
Figure 7:
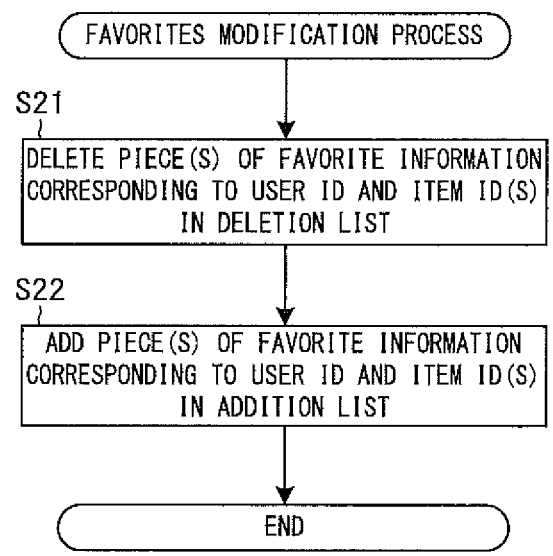
FIG. 7 is a flowchart showing an example process of a favorites modification process in the system controller 14 of the online marketplace server 1 according to an embodiment.

The following describes an operation of the information providing system S with reference to FIGS. 6 and 7.

FIG. 6 is a flowchart showing an example process of an add-to-favorites request reception process in the system controller 14 of the online marketplace server 1 according to this embodiment. The add-to-favorites request reception process is initiated when the addition request receiver 141 receives an add-to-favorites request sent from the user terminal 2 to the online marketplace server 1.

As shown in FIG. 6, the favorites storing unit 142 registers favorite information (Step S1). Specifically, the favorites storing unit 142 obtains a user ID and an item ID from the add-to-favorites request. The favorites storing unit 142 also obtains the current date and time as an added date and time. The favorites storing unit 142 also searches the operation history DB 12d for search logs including the obtained user ID. Subsequently, the favorites storing unit 142 selects the search log including the latest operation date and time from among the retrieved search logs. Then, the favorites storing unit 142 obtains search criteria information from the selected search log. Next, the favorites storing unit 142 generate favorite information including the user ID, the item ID, the added date and time, and the search criteria information. The favorites storing unit 142 stores the generated favorite information in the favorite information DB 12e.

Subsequently, the modification controller 144 determines whether the modification control flag corresponding to the user ID is set to FALSE in the member information DB 12a (Step S2). Here, if the modification controller 144 determines that the modification control flag is not set to FALSE (NO in Step S2), the modification controller 144 terminates the add-to-favorites request reception process. On the other hand, if the modification controller 144 determines that the modification control flag is set to FALSE (YES in Step S2), the process proceeds to Step S3.

In Step S3, the information retriever 143 searches the favorite information DB 12e for favorite information that includes the obtained user ID and that was stored after the latest login date and time. Specifically, the information retriever 143 searches the operation history DB 12d for search logs that include the obtained user ID and that indicate a login. Subsequently, the information retriever 143 selects the operation log including the latest operation date and time from among the retrieved operation logs. The operation date and time of an operation log indicating a login is a login date and time. The information retriever 143 searches for favorite information whose added date and time is after the latest login date and time.

Then, based on the retrieved pieces of favorite information, the information retriever 143 identifies the majority genre from among the genres at the universal condition level of the items added to the favorites by the user (Step S4). Specifically, the information retriever 143 retrieves the genre ID corresponding to the item ID included in each piece of favorite information from the item information DB 12c. Next, based on the genre IDs and the genre information DB 12b, the information retriever 143 retrieves the genre IDs at the universal condition level of the items added to the favorites. Subsequently, the information retriever 143 counts, for each set of the same genre IDs, the number of the same genre IDs. Then, the information retriever 143 identifies the genre ID with the highest count.

Subsequently, the modification controller 144 calculates the percentage of the majority genre by dividing the number of the genre IDs identified in Step S4 by the number of the retrieved pieces of favorite information. Then, the modification controller 144 determines whether the calculated percentage is greater than or equal to a threshold value 1 prestored in the storage unit 12 (Step S5). The threshold value 1 may be, for example, 100% or a value less than 100%. If the modification controller 144 determines that the calculated percentage is less than the threshold value 1 (NO in Step S5), the modification controller 144 terminates the add-to-favorites request reception process. On the other hand, if the modification controller 144 determines that the calculated percentage is greater than or equal to threshold value 1 (YES in Step S5), the process proceeds to Step S6. In Step S6, the modification controller 144 determines the genre ID identified in Step S4 as the genre ID of the universal genre.

Subsequently, the information retriever 143 determines a reference date and time (Step S7). For example, the information retriever 143 calculates the length of time from the login date and time to the current date and time. Next, the information retriever 143 calculates the length of time of a convergence period by multiplying the calculated length of time and the convergence period percentage stored in the storage unit 12. Then, the information retriever 143 calculates the reference date and time by subtracting the length of time of the convergence period from the current date and time.

Subsequently, the information retriever 143 identifies the majority genre from among the genres at the convergence condition level of the items that were added to the favorites after the reference date and time (Step S8). Specifically, the information retriever 143 extracts favorite information whose added date and time is after the reference date and time, from among the pieces of favorite information retrieved in Step S3. Then, the information retriever 143 retrieves the genre ID corresponding to the item ID included in each extracted piece of favorite information from the item information DB 12c. Next, based on the genre IDs and the genre information DB 12b, the information retriever 143 retrieves the genre IDs at the convergence condition level of the items added to the favorites. Subsequently, the information retriever 143 counts, for each set of the same genre IDs, the number of the same genre IDs. Then, the information retriever 143 identifies the genre ID with the highest count.

Subsequently, based on the genre ID of the universal genre, the genre ID identified in Step S8, and the genre information DB 12b, the modification controller 144 determines whether the majority genre at the convergence condition level belongs to the universal genre. Here, if the modification controller 144 determines that the majority genre does not belong to the universal genre (NO in Step S9), the modification controller 144 terminates the add-to-favorites request reception process. On the other hand, if the modification controller 144 determines that the majority genre belongs to the universal genre (YES in Step S9), the process proceeds to Step S10.

In Step S10, the modification controller 144 calculates the percentage of the majority genre by dividing the number of the genre IDs identified in Step S8 by the number of the pieces of favorite information extracted in Step S8. Then, the modification controller 144 determines whether the calculated percentage is greater than or equal to a threshold value 2 prestored in the storage unit 12. The threshold value 2 may be, for example, 100% or a value less than 100%. If the modification controller 144 determines that the calculated percentage is less than the threshold value 2 (NO in Step S10), the modification controller 144 terminates the add-to-favorites request reception process. On the other hand, if the modification controller 144 determines that the calculated percentage is greater than or equal to the threshold value 2 (YES in Step S10), the process proceeds to Step S11. In Step S11, the modification controller 144 determines the genre ID of the majority genre at the convergence condition level as the genre ID of the converged genre.

Subsequently, the modification controller 144 extracts favorite information whose added date and time is before the reference date and time, from among the pieces of favorite information retrieved in Step S3 (Step S12). Then, the modification controller 144 adds, to a deletion candidate list, the item ID(s) of the item(s) that were added to the favorites before the reference date and time and that do not belong to the converged genre (Step S13). Specifically, the modification controller 144 retrieves, from the item information DB 12c, the genre ID corresponding to the item ID included in each piece of favorite information retrieved in Step S12. Then, based on the retrieved genre IDs and the genre information DB 12b, the modification controller 144 retrieves the genre IDs at the convergence condition level corresponding to the retrieved genre IDs. Next, the modification controller 144 adds, to the deletion candidate list, the item ID(s) of the item(s) whose genre ID at the convergence condition level is different from the genre ID of the converged genre.

Subsequently, the modification controller 144 retrieves item page view logs from among the operation logs corresponding to the user ID obtained from the add-to-favorites request (Step S14). At this time, the modification controller 144 retrieves view logs whose operation date and time is included in the range from the latest login date and time to the reference date and time. Next, the modification controller 144 extracts items that belong to the converged genre from among the items corresponding to the item pages that were viewed between the latest login date and time and the reference date and time (Step S15). Specifically, the modification controller 144 retrieves, from the item information DB 12c, the genre ID corresponding to the item ID included in each of the extracted view logs. Then, based on the retrieved genre IDs and the genre information DB 12b, the modification controller 144 retrieves the genre IDs at the convergence condition level corresponding to the retrieved genre IDs. Next, the modification controller 144 identifies the item IDs of the items whose genre ID at the convergence condition level is the same as the genre ID of the converged genre.

Subsequently, the modification controller 144 adds, to an addition candidate list, the item ID(s) of the item(s) that belong to the converged genre and that are not yet added to the favorites (Step S16). Specifically, the modification controller 144 searches the favorite information DB 12e for favorite information that includes the user ID obtained from the add-to-favorites request and any of the identified item IDs. Then, the modification controller 144 adds, to the addition candidate list, the item ID(s) of the item(s) that do not correspond to any favorite information stored in the favorite information DB 12e.

Subsequently, the modification controller 144 generates an HTML document for a favorites modification confirmation page, based on the deletion candidate list and the addition candidate list (Step S17). Then, the modification controller 144 sends the generated HTML document to the user terminal 2 that sent the add-to-favorites request (Step S18). The modification controller 144 sends the HTML document for the favorites modification confirmation page to cause the user terminal 2 to present the deletion candidate(s) and the addition candidate(s). Next, the modification controller 144 sets the modification control flag corresponding to the user ID to TRUE, in the member information DB 12a (Step S19). After Step S19, the modification controller 144 terminates the add-to-favorites request reception process. The user terminal 2, which has received the HTML document from the online marketplace server 1, displays the favorites modification confirmation page, for example, as shown in FIG. 3.

FIG. 7 is a flowchart showing an example process of a favorites modification process in the system controller 14 of the online marketplace server 1 according to this embodiment. When the user selects the modification button 140 on the favorites modification confirmation page, the user terminal 2 sends a modification request to the online marketplace server 1. The modification request is a message indicating a request to modify the favorites. The modification request includes a user ID, a deletion list, and an addition list. The user ID indicates the user who made the request to modify the favorites. To the deletion list, the item ID(s) of item(s) selected by the user from among the deletion candidate(s) are added. To the addition list, the item ID(s) of item(s) selected by the user from among the addition candidate(s) are added. The favorites modification process is initiated when the online marketplace server 1 receives the modification request from the user terminal 2. As shown in FIG. 7, the modification controller 144 deletes, from the favorite information DB 12e, the piece(s) of favorite information corresponding to the user ID included in the modification request and the item ID(s) added to the deletion list (Step S21). Then, the modification controller 144 adds, to the favorite information DB 12e, the piece(s) of favorite information corresponding to the user ID included in the modification request and the item ID(s) added to the addition list (Step S22). The details of the step of adding the piece(s) of favorite information are essentially the same as Step S1 of the add-to-favorites request reception process. After Step S22, the modification controller 144 terminates the favorites modification process.

As described above, according to this embodiment, the system controller 14 obtains an add-to-favorites request including the item ID of an item added to favorites, which include the references to item pages, and the user ID of a user who performed an add-to-favorites operation. Subsequently, the system controller 14 stores the obtained item ID and the obtained user ID in association with each other as favorite information in the storage unit 12. Then, the system controller 14 obtains the genre IDs that indicate the range including the items identified by the item IDs stored in the storage unit 12 in association with the obtained user ID. If the system controller 14 determines that the range of the items added to the favorites has converged based on the genre IDs, the system controller 14 controls modification of at least one of an excess and a deficiency of the items in the favorites, in accordance with the condition that only the items included in the converged range are items to be added to the favorites. Thus, this embodiment can modify at least one of an excess and a deficiency in addition of items to the favorites before a criterion for selecting items has been fully established.

In addition, if the attribute of one or more items added at or after the reference date and time, among a plurality of items added to the favorites, is weighted in part of the attribute range of the plurality of items, the system controller 14 determines that the attribute of the items has converged. Thus, whether the user's selection criterion has been established can be properly determined.

Moreover, the system controller 14 causes item(s) not included in the converged range, among the items identified by the item IDs included in the pieces of favorite information stored in the storage unit 12, to be presented as deletion candidate(s) from the favorites. Consequently, item(s) that are unlikely to match the current criterion, among the items added to the favorites before the selection criterion has been fully established, can be presented.

In addition, the system controller 14 causes item(s) included in the converged range, among the items that are different from the item identified by the item IDs included in the pieces of favorite information stored in the storage unit 12 and for which at least part of information included in their item pages was displayed, to be presented as addition candidate(s) to the favorites. Consequently, item(s) that are likely to match the current criterion, among the items not added to the favorites before the selection criterion has been fully established, can be presented.

Moreover, the system controller 14 causes only item(s) whose item page was viewed by the user, to be presented as addition candidate(s) to the favorites. Thus, after the selection criterion has been fully established, item (s) that the user is likely to search for in order to add to the favorites can be presented.

2. Second Embodiment

Figure 8:
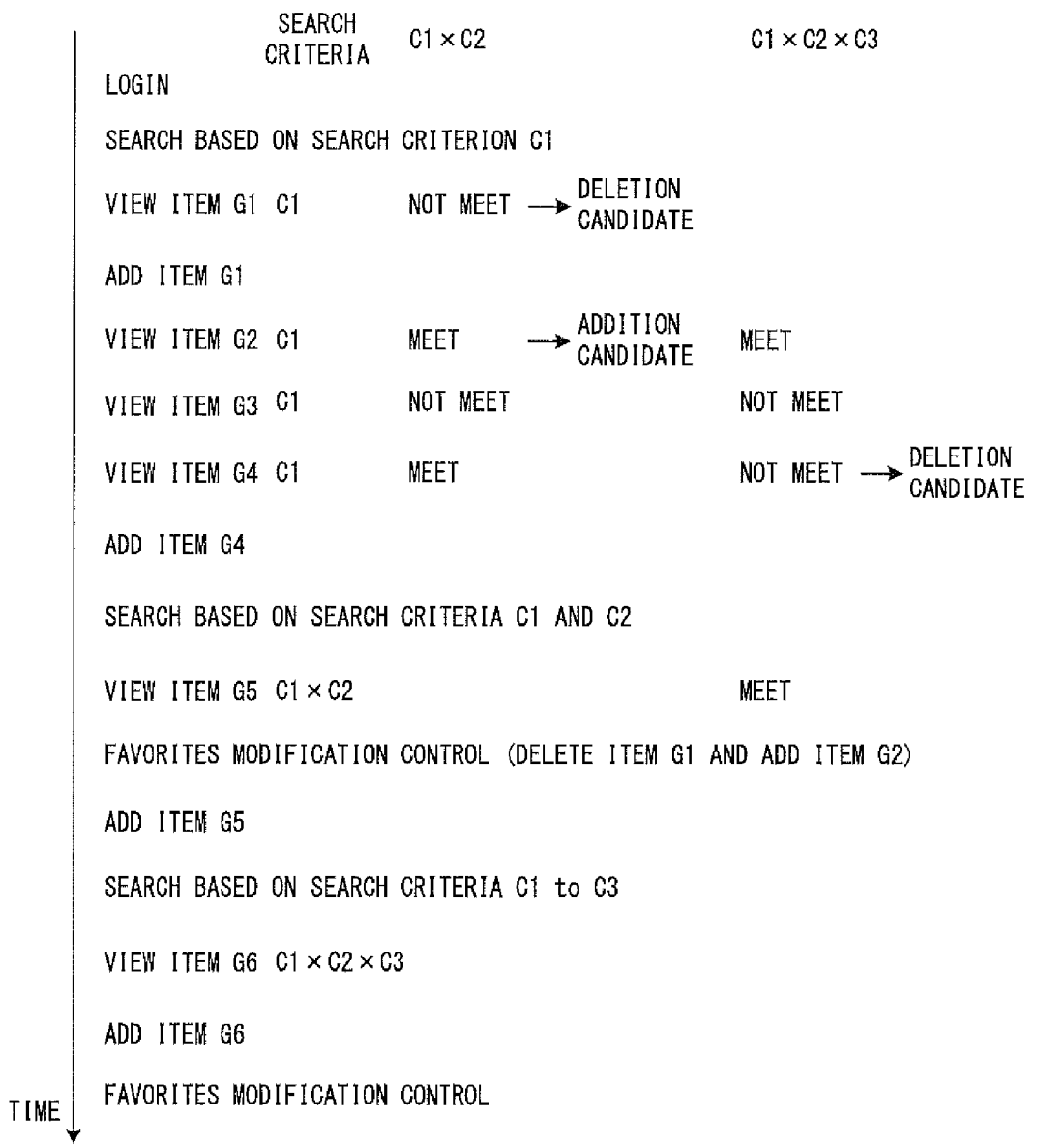
FIG. 8 is a diagram showing an example of how to determine deletion candidates and addition candidates.
Figure 9:
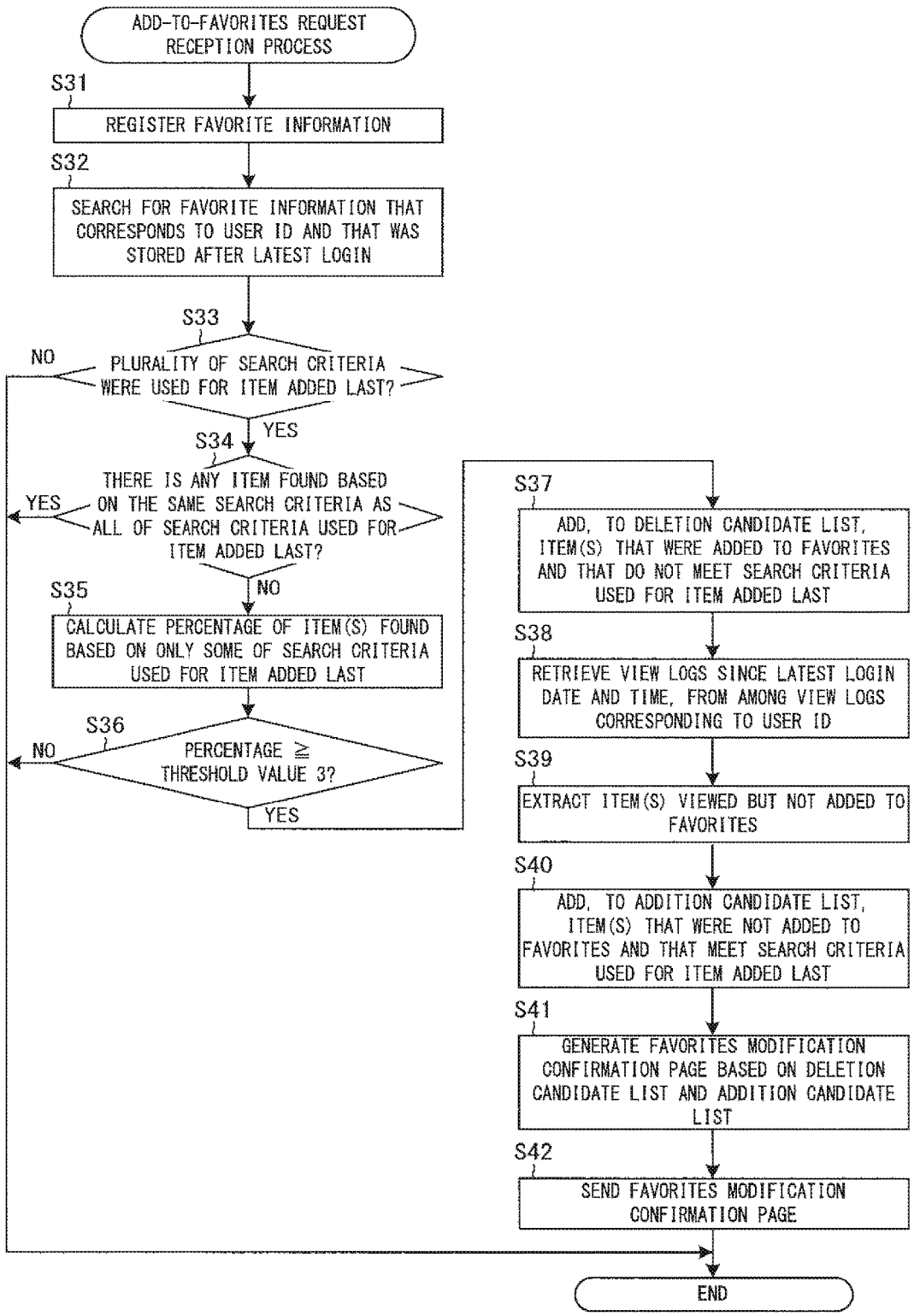
FIG. 9 is a flowchart showing an example process of the add-to-favorites request reception process in the system controller 14 of the online marketplace server 1 according to an embodiment.

The following describes a second embodiment with reference to FIGS. 8 and 9. In this embodiment, search criteria that a user specifies when searching for items are used as information identifying the range of the items added to the user's favorites. The reason is that the search criteria probably correspond to the user's item selection criterion. The range of items to be found can change depending on the search criteria. The user can specify one or more search criteria when searching for items. When a plurality of search criteria are specified, items that meet all the search criteria are searched for. Thus, the more the number of search criteria is, the narrower the range of items to be found is. The more the number of search criteria is, the more probable it is that the user's item selection criterion is clear. When the user makes a search by adding a new search criterion to the search criteria that were used in searching for the items added to the favorites before and then adds an item found by the new search to the favorites, the online marketplace server 1 determines that the range of the items added to the favorites has converged. Thus, the online marketplace server 1 may perform the favorites modification control every time an item found by adding a new search criterion is added to the favorites.

FIG. 8 is a diagram showing an example of how to determine deletion candidates and addition candidates. As shown in FIG. 2, a user specifies a search criterion C1. Then, for example, items G1 to G6 are found. The user views an item page for the item G1, and adds the item G1 to the user's favorites. Subsequently, the user views an item page for the item G2, but does not add the item G2 to the favorites. Then, the user views an item page for the item G3, but does not add the item G3 to the favorites. Next, the user adds the item G4 to the favorites.

Subsequently, the user specifies search criteria C1 and C2. Then, for example, the items G2 and G4 to G6 are found. The user views an item page for the item G5, and adds the item G5 to the favorites. The search criterion used in searching for the items G1 and G4, which were added to the favorites before, is the search criterion C1. The search criteria used in searching for the item G5, which is added to the favorites this time, are the search criteria C1 and C2. Thus, the online marketplace server 1 controls modification of the favorites. Specifically, the online marketplace server 1 determines the item G1 added to the favorites as a deletion candidate because the item G1 does not meet both the search criteria C1 and C2. The online marketplace server 1 also determines the item G2 not added to the favorites as an addition candidate because the item G2 meets both the search criteria C1 and C2. In response to the user's selection, the online marketplace server 1 deletes the item G1 from the favorites and adds the item G2 to the favorites.

Subsequently, the user specifies search criteria C1 to C3. Then, for example, items G2 and G6 are found. The user views an item page for the item G6, and adds the item G6 to the favorites. Also at this time, the online marketplace server 1 controls modification of the favorites. Specifically, the online marketplace server 4 determines the item G4 added to the favorites as a deletion candidate because the item. G4 does not meet all the search criteria C1 to C3.

FIG. 9 is a flowchart showing an example process of the add-to-favorites request reception process in the system controller 14 of the online marketplace server 1 according to this embodiment. As shown in FIG. 9, the favorites storing unit 142 registers favorite information (Step S31). Subsequently, the information retriever 143 searches the favorite information DB 12e for favorite information that includes the obtained user ID and that was stored after the latest login date and time (Step S32). Steps S31 and S32 are the same as Steps S1 and S3 shown in FIG. 6.

Subsequently, the modification controller 144 obtains search criteria information from the favorite information registered in Step S31. In the second embodiment, the search criteria information is an example of the specific information of the present invention. Then, based on the obtained search criteria information, the modification controller 144 determines whether a plurality of search criteria were used in searching for the last item added to the favorites (Step S33). Here, if the modification controller 144 determines that only one search criterion was used (NO in Step S33), the modification controller 144 terminates the add-to-favorites request reception process. On the other hand, if the modification controller 144 determines that a plurality of search criteria were used (YES in Step S33), the process proceeds to Step S34.

In Step S34, based on the search criteria information included in each of the retrieved pieces of favorite information, the modification controller 144 determines whether the items added to the favorites include any item that was found based on the same search criteria as all of the plurality of search criteria used for the last item added to the favorites.

Here, if the modification controller 144 determines that there is an item that was found based on the same search criteria as all of the plurality of search criteria used for the item added last (YES in Step S34), the modification controller 144 terminates the add-to-favorites request reception process. The reason is that the modification control has been already performed. On the other hand, if the modification controller 144 determines that there is no item that was found based on the same search criteria as all of the plurality of search criteria used for the item added last (NO in Step S34), the process proceeds to Step S35.

In Step S35, the modification controller 144 extracts, from among the items added to the favorites, item(s) that were found based on only some of the plurality of search criteria used for the item added last. Subsequently, the modification controller 144 calculates the percentage of the extracted item(s) relative to the items added to the favorites. Then, the modification controller 144 determines whether the calculated percentage is greater than or equal to a threshold value 3 prestored in the storage unit 12 (Step S36). The threshold value 3 may be, for example, 100% or a value less than 100%. If the modification controller 144 determines that the calculated percentage is less than the threshold value 3 (NO in Step S36), the modification controller 144 terminates the add-to-favorites request reception process. On the other hand, if the modification controller 144 determines that the calculated percentage is greater than or equal to the threshold value 3 (YES in Step S36), the process proceeds to Step S37.

In Step S37, the modification controller 144 adds, to a deletion candidate list, the item ID(s) of the item(s) that were added to the favorites and that do not meet all of the plurality of search criteria used for the item added last. For example, the modification controller 144 may search the item information DB 12c for item information based on the plurality of search criteria used for the item added last. Then, the modification controller 144 obtains the item IDs from the pieces of favorite information retrieved in Step S32. Subsequently, the modification controller 144 retrieves item information that includes any of the obtained item IDs, from among the retrieved pieces of item information. At this time, the modification controller 144 adds, to the deletion candidate list, the item ID(s) for which no corresponding item information is found.

Subsequently, the modification controller 144 retrieves item page view logs from among the operation logs corresponding to the user ID obtained from the add-to-favorites request (Step S38). At this time, the modification controller 144 retrieves view logs whose operation date and time is the latest login date and time or after. Then, the modification controller 144 extracts, from among the items corresponding to the item pages viewed at or after the login date and time, item(s) that meet all of the plurality of search criteria used for the item added last (Step S39). Specifically, the modification controller 144 obtains the item IDs from the retrieved view logs. Subsequently, the modification controller 144 retrieves item information that includes any of the obtained item IDs, from among the pieces of item information retrieved in Step S37. Then, the modification controller 144 identifies the item ID(s) for which the corresponding item information is found.

Next, the modification controller 144 adds, to an addition candidate list, the identified item ID(s) (Step S40). Subsequently, the modification controller 144 generates an HTML document for the favorites modification confirmation page, based on the deletion candidate list and the addition candidate list (Step S41). Then, the modification controller 144 sends the generated HTML document to the user terminal 2 that sent the add-to-favorites request (Step S42). Steps S41 and S42 are the same as Steps S17 and S18 shown in FIG. 6. After Step S42, the modification controller 144 terminates the add-to-favorites request reception process.

As described above, according to this embodiment, the system controller 14 obtains search criteria information. Subsequently, based on the search criteria information, the system controller 14 determines whether any new search criterion is added to the search criteria used in searching for the items added to the favorites. If the system controller 14 determines that a new search criterion is added, the system controller 14 determines that the range of the items added to the favorites has converged. Then, the system controller 14 determines, as deletion candidate(s), item(s) that were added to the favorites and that do not match all of the plurality of search criteria including the new search criterion. The system controller 14 also determines, as addition candidate(s), item(s) that were not added to the favorites and that match all of the plurality of search criteria including the new search criterion. Thus, the favorites can be modified based on search criteria.

3. Third Embodiment

Figure 11:
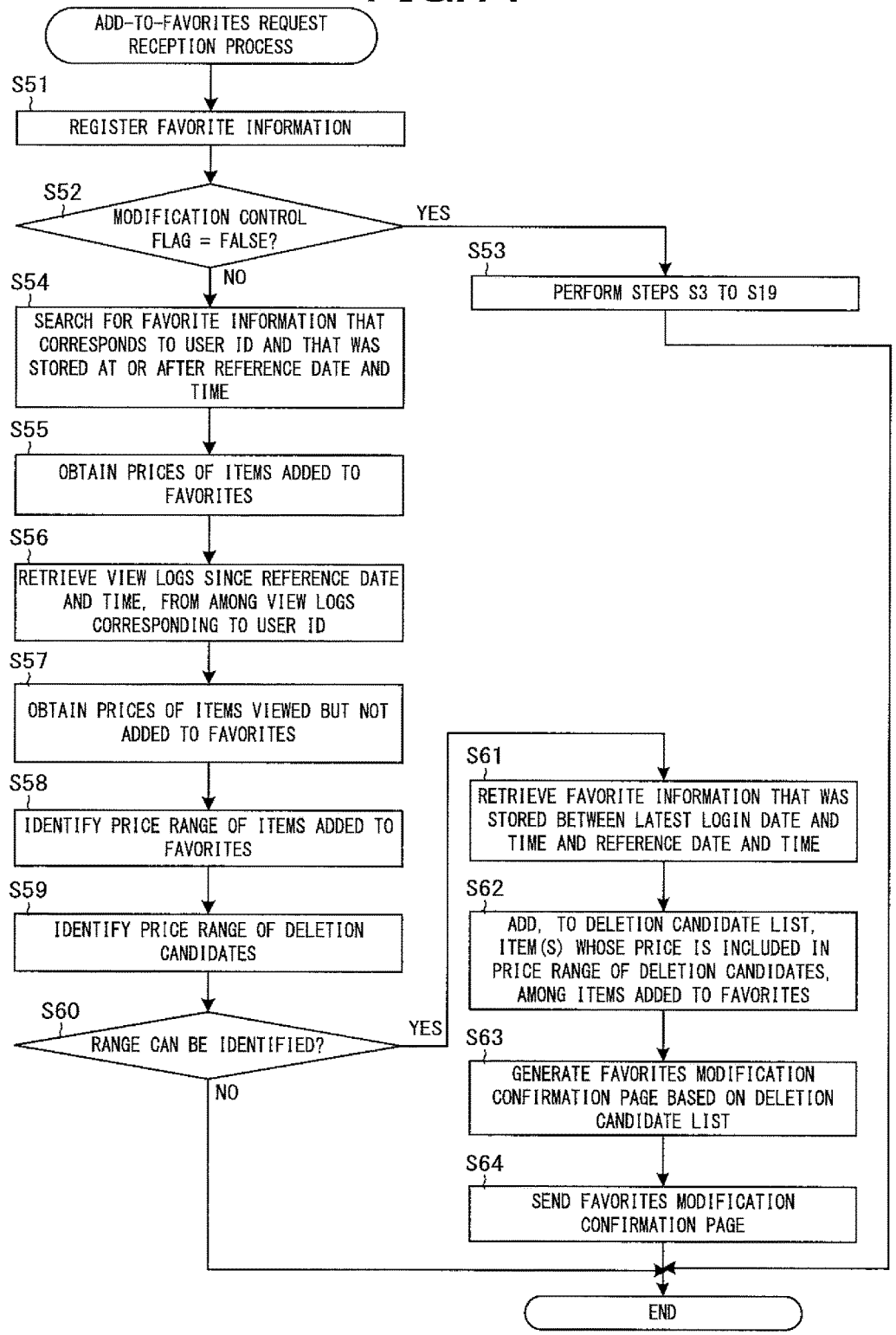
FIG. 11 is a flowchart showing an example process of the add-to-favorites request reception process in the system controller 14 of the online marketplace server 1 according to an embodiment.

The following describes a third embodiment with reference to FIGS. 10 and 11. In this embodiment, the online marketplace server 1 performs the modification control based on certain information identifying the range of the items, and then performs the favorites modification control based on other information. In the first embodiment, only one type of attribute is used as information indicating the user's item selection criterion. However, some users may have a plurality of types of selection criteria. As such a user selects one item after another, each of the plurality of types of selection criteria may become clear. Thus, after it is determined that the range of the items added to the favorites has converged based on a first attribute or search criteria, the online marketplace server 1 controls deletion of items from the favorites, based on the second attribute of the items added to the favorites and the second attribute of the items not added to the favorites after the range of the items added to the favorites has converged. For example, when a user selects items based on the both the first and second attributes, the user does not add items whose second attribute does not match the user's selection criteria For this reason, the online marketplace server 1 determine, as deletion candidate(s), item(s) whose second attribute is included in the range that is within the second attribute range of the items not added to the user's favorites after the range of the items has converged and that does not overlap with the second attribute range of the items added to the favorites after the range of the items has converged. For example, the online marketplace server 1 may determine, as the time when the range of the items converged, the time when an item was added to the favorites for the first time since the reference date and time. As long as the first and second attributes are different, the first and second attributes may be any attributes. In this embodiment, genre is used as the first attribute, and price is used as the second attribute.

FIG. 10 is a diagram showing an example of how to determine deletion candidates. As shown in FIG. 10, a user sequentially adds, for example, the items G1 to G6 to the user's favorites. The genre of the items G1, G2, and G4 to G6 is "genre X", and the genre of the item G3 is "genre Y". The prices of the items G1, G2, G3, G4, G5, and G6 are respectively 5000 yen, 3000 yen, 4000 yen, 3000 yen, 1000 yen, and 2000 yen. After the item G6 is added, for example, the online marketplace server 1 specifies the reference date and time between when the item G3 was added and when the item G4 was added. Then, the online marketplace server 1 determines that the genre has converged to "genre X", and deletes the item G3 from the favorites in response to the user's selection.

After that, the user views an item page for an item G7, but does not add the item G7 to the favorites. Subsequently, the user also does not add an item G8 to the favorites. Then, the user adds an item G9 to the favorites. The genre of the items G7 to G9 is "genre X". The prices of the G7, G8, and G9 are respectively 4000 yen, 2500 yen, and 3000 yen. The price range of the items not added to the favorites after the genre has converged includes at least 2500 and 4000 yen. The price range of the items added to the favorites after the genre has converged is 1000 to 3000 yen. The online marketplace server 1 excludes 2500 yen, which is included in the range from 1000 to 3000 yen, from the price range of deletion candidates. Then, the online marketplace server 1 identifies the price range of deletion candidates so that the price range does not overlap with the price range of the items added to the favorites. For example, the online marketplace server 1 may determine a range of 4000 yen or more as the price range of deletion candidates. Thus, the online marketplace server 1 determines the item G1, whose price is 5000 yen, as a deletion candidate.

FIG. 11 is a flowchart showing an example process of the add-to-favorites request reception process in the system controller 14 of the online marketplace server 1 according to this embodiment. As shown in FIG. 11, the favorites storing unit 142 registers favorite information (Step S51). Step S51 is the same as Step S1 shown in FIG. 6. Subsequently, the modification controller 144 determines whether the modification control flag corresponding to the user ID is set to FALSE in the member information DB 12*a* (Step S52). Here, if the modification controller 144 determines that the modification control flag is set to FALSE (YES in Step S52), Steps S3 to S19 shown in FIG. 6 are performed (Step S53). If the favorites modification control is performed here, in Step S19, the modification controller 144 stores the reference date and time in association with the user ID obtained from the add-to-favorites request, in the member information DB 12*a*. On the other hand, if the modification controller 144 determines that the modification control flag is not set to FALSE (NO in Step S52), the process proceeds to Step S54.

In Step S54, the information retriever 143 obtains the user ID from the add-to-favorites request. Subsequently, the information retriever 143 retrieves the reference date and time corresponding to the obtained user ID from the member information DB 12*a*. Then, the information retriever 143 retrieves favorite information whose added date and time is the reference date and time or after, among the pieces of favorite information that include the obtained user ID, from the favorite information DB 12*e*. Next, the information retriever 143 obtains the prices of the items added to the favorites (Step S55). Specifically, the information retriever 143 obtains the item IDs from the retrieved pieces of favorite information. Then, the information retriever 143 retrieves the prices corresponding to the obtained item IDs from the member information DB 12*a*.

Subsequently, the information retriever 143 retrieves item page view logs, among the operation logs corresponding to the obtained user ID, from the operation history DB 12*d* (Step S56). At this time, the information retriever 143 retrieves view logs whose operation date and time is the reference date and time or after. Next, the information retriever 143 obtains the prices of the items not added to the favorites, among the items corresponding to the item pages viewed at or after the reference date and time (Step S57). Specifically, the information retriever 143 obtains the item IDs from the retrieved view logs. Then, the information retriever 143 retrieves the prices corresponding to the obtained item IDs from the member information DB 12*a*.

Subsequently, based on the prices obtained in Step S55, the modification controller 144 identifies the price range of the items added to the favorites (Step S58). For example, the modification controller 144 may determine the range from the minimum to the maximum of the obtained prices as the price range of the items added to the favorites. Next, the modification controller 144 identifies the price range of deletion candidates (Step S59). Specifically, the modification controller 144 extracts prices not included in the price range of the items added to the favorites from among the prices obtained in Step S57. Then, the modification controller 144 determines the price range of deletion candidates so that the price range includes the extracted prices and does not overlap with the price range of the items added to the favorites.

Next, the modification controller 144 determines whether the price range of deletion candidates can be identified (Step S60). Here, if the modification controller 144 determines that the price range of deletion candidates cannot be identified (NO in Step S60), the modification controller 144 terminates the add-to-favorites request reception process. On the other hand, if the modification controller 144 determines that the price range of deletion candidates can be identified (YES in Step S60), the process proceeds to Step S61.

In Step S61, the modification controller 144 retrieves favorite information that was stored in the favorite information DB 12*e* between the latest login date and time and the reference date and time, among the pieces of favorite information corresponding to the obtained user ID. Then, the modification controller 144 adds, to a deletion candidate list, the item ID(s) of the item(s) whose price is included in the price range of deletion candidates, among the items added to the favorites between the latest login date and time and the reference date and time (Step S62). Specifically, the modification controller 144 obtains the item IDs from the pieces of favorite information retrieved in Step S61. Subsequently, the information retriever 143 retrieves the prices corresponding to the obtained item IDs from the member information DB 12*a*. Then, the modification controller 144 adds, to the deletion candidate list, the item ID(s) of the item(s) whose retrieved price is included in the price range of deletion candidates.

Next, the modification controller 144 generates an HTML document for the favorites modification confirmation page, based on the deletion candidate list (Step S63). Then, the modification controller 144 sends the generated HTML document to the user terminal 2 that sent the add-to-favorites request (Step S64). After Step S64, the modification controller 144 terminates the add-to-favorites request reception process.

As described above, according to this embodiment, the system controller 14 retrieves the second attribute of the items identified by the item IDs included in the pieces of favorite information that were stored in the storage unit 12 after the range of the items added to the favorites had converged and the second attribute of the items corresponding to the item pages that were viewed after the range of the items added to the favorites had converged. Subsequently, the system controller 14 identifies a range that does not overlap with the second attribute range of the items added to the favorites, in the second attribute range of the items that correspond to the viewed item pages and that were not added to the favorites. Then, the system controller 14 controls deletion of the items whose second attribute is included in the identified range from the favorites. Thus, when a user has a plurality of selection criteria, item(s) that do not match the plurality of selection criteria can be deleted from the user's favorites.

In the embodiments described above, selection objects of the present invention are represented by items. However, the present invention can be applied to, for example, things and matters that can be selected as objects to be added to a list of the present invention. For example, the selection objects of the present invention may be services, rights such as patents, documents, sounds, images, web pages, news, events, or information.

In the embodiments described above, the list of the present invention is represented by favorites. However, the list of the present invention may be a list that includes references to information about selection objects and enables information about the added selection objects to be referred. For examples, the list of the present invention may be bookmarks or an e-commerce shopping cart.

In the embodiments described above, an information processing apparatus according to the present invention is implemented on a server device in a client-server system. However, the information processing apparatus according to the present invention may be implemented on an information processing apparatus other than the server device. For example, the information processing apparatus according to the present invention may be implemented on the user terminal 2. Also for example, a controller included in the information processing apparatus may function as means of the present invention and thus cause display means, such as a display, to present deletion candidates and addition candidates. In this case, the display means may be included in the information processing apparatus. Alternatively, the display means may be a device separate from the information processing apparatus.

REFERENCE SIGNS LIST

1 online marketplace server
2 user terminal
11 communication unit
12 storage unit
12*a* member information DB
12*b* genre information DB
12*c* item information DB
12*d* operation history DB
12*e* favorite information DB
13 input/output interface
14 system controller
14*a* CPU
14*b* ROM
14*c* RAM
15 system bus
NW network
S information providing system

The invention claimed is:

1. An information processing apparatus comprising:
at least one memory configured to store computer program code;
at least one processor configured to access said memory and operate as instructed by said computer program code, said computer program code including:
identification information obtaining code configured to cause at least one of said at least one processor to based on receiving a plurality of add-to-list requests, obtain object identification information identifying a plurality of objects associated with the add-to-list requests, which are objects object to be added to a list associated with user identification information identifying a user who transmitted the add-to-list requests;
storage control code configured to cause at least one of said at least one processor to store, in the at least one memory, the obtained object identification information as items added to the list associated with the user identification information;
information retrieval code configured to cause at least one of said at least one processor to retrieve specific information indicating a plurality of common attributes or common attribute ranges that are common to at least two of the plurality of objects stored in the memory in the list associated with the obtained user identification information; and
modification control code configured to cause at least one of said at least one processor to (i) determine whether the plurality of common attributes or common attribute ranges include common attributes or common attribute ranges that are on different levels of a multi-level hierarchy, and (ii) based on determining that the common attributes or common attribute ranges include common attributes or common attribute ranges that are on different levels of the multi-level hierarchy, determine, as a convergence attribute or a convergence attribute range, an attribute or attribute range that is at a lower level of the multi-level hierarchy from among the different levels that the common attributes or common range of attributes are on, and control modification of the list based on the convergence attribute or convergence attribute range, the modification including at least one of: (i) newly-adding an object, which is not already included in the list and that has the convergence attribute or convergence attribute range, to the list, or (ii) deleting one of the objects from the list that has at least one of the common attributes or common attribute ranges that are on different levels, but does not have the convergence attribute or convergence attribute range, wherein
the convergence attribute or the convergence attribute range is an attribute or an attribute range that one or more objects among the plurality objects have,
the one or more objects were added to the list at a relatively later time among a plurality of times at which the respective plurality of objects were added to the list,
the object that is to be newly-added to the list has already been accessed or viewed by the user, and
the modification includes both of newly-adding and deleting.

2. The information processing apparatus according to claim 1, wherein when an attribute of an object added to the list at or after a certain time, among the plurality of objects added to the list, is weighted in part of an attribute range of the plurality of objects, the modification control code causes at least one of said at least one processor to determine that the attribute range of the object added to the list at or after the certain time to be the convergence attribute range.

3. The information processing apparatus according to claim 2, wherein the modification control code causes at least one of said at least one processor to cause the one of the objects from the list that has the at least one of the common attributes or common attribute ranges that are on the different levels of the multi-level hierarchy, but does not have the convergence attribute or convergence attribute range, a selection object not included in the converged range, among the plurality of selection objects identified by the plurality of pieces of selection object identification information stored in the storage, to be presented as a deletion candidate for deletion from the list.

4. The information processing apparatus according to claim 2, wherein the modification control code configured to cause at least one of said at least one processor to cause the object, which is not already included in the list and that has the convergence attribute or convergence attribute range, to the list, to be presented as an addition candidate for addition to the list.

5. The information processing apparatus according to claim 4, wherein the object, which is not already included in the list and that has the convergence attribute or convergence attribute range, which is presented as the addition candidate is an object that has already been accessed or viewed by the user.

6. The information processing apparatus according to claim 2, wherein
 the information retrieval code is further configured to cause at least one of said at least one processor to retrieve attribute information of an object accessed after the determining that the common attributes or common attribute ranges include the common attributes or common attribute ranges that are on the different levels of the multi-level hierarchy;
 the identification code is further configured to cause at least one of said at least one processor to identify a range that is within an attribute range of the accessed object, which has not yet been added to the list, that does not overlap with an attribute range of the objects already added to the list, based on the retrieved attribute information of the object accessed after the determining that the common attributes or common attribute ranges include the common attributes or common attribute ranges that are on the different levels of the multi-level hierarchy; and
 control deletion of an object having attribute information corresponding to being included the identified range from the list.

7. The information processing apparatus according to claim 1, wherein the modification control code causes at least one of said at least one processor to cause the one of the objects from the list that has the at least one of the common attributes or common attribute ranges that are on the different levels of the multi-level hierarchy, but does not have the convergence attribute or convergence attribute range, to be presented as a deletion candidate for deletion from the list.

8. The information processing apparatus according to claim 1, wherein the modification control code causes at least one of said at least one processor to cause the object, which is not already included in the list and that has the convergence attribute or convergence attribute range, to the list, to be presented as an addition candidate for addition to the list.

9. The information processing apparatus according to claim 8, wherein the object, which is not already included in the list and that has the convergence attribute or convergence attribute range, which is presented as the addition candidate is an object that has already been accessed or viewed by the user.

10. The information processing apparatus according to claim 1, wherein
 the information retrieval code is further configured to cause at least one of said at least one processor to retrieve attribute information of an object accessed after the determining that the common attributes or common attribute ranges include the common attributes or common attribute ranges that are on the different levels of the multi-level hierarchy;
 the identification code is further configured to cause at least one of said at least one processor to identify a range that is within an attribute range of the accessed object, which has not yet been added to the list, that does not overlap with an attribute range of the objects already added to the list, based on the retrieved attribute information of the object accessed after the determining that the common attributes or common attribute ranges include the common attributes or common attribute ranges that are on the different levels of the multi-level hierarchy; and
 control deletion of an object having attribute information corresponding to being included the identified range from the list.

11. The information processing apparatus according to claim 1, wherein the modification occurs based on determining, as the convergence attribute or convergence attribute range, the attribute or attribute range that is at the lower level of the multi-level hierarchy from among the different levels that the common attributes or common range of attributes are on and based on the convergence attribute or convergence attribute range corresponding to a second object was added to the list after a first object corresponding an attribute or attribute range that is at a higher level of the multi-level hierarchy was added to the list.

12. An information processing method performed by a computer, the method comprising:
 based on receiving a plurality of add-to-list requests, obtaining object identification information identifying a plurality of objects associated with the add-to-list requests, which are objects object to be added to a list associated with user identification information identifying a user who transmitted the add-to-list requests;
 storing, in at least one memory, the obtained object identification information as items added to the list associated with the user identification information;
 retrieving, from the at least one memory, specific information indicating a plurality of common attributes or common attribute ranges that are common to at least two of the plurality of objects stored in the memory in the list associated with the obtained user identification information; and
 performing a modification process that includes: (i) determining whether the plurality of common attributes or common attribute ranges include common attributes or common attribute ranges that are on different levels of a multi-level hierarchy, and (ii) based on determining that the common attributes or common attribute ranges include common attributes or common attribute ranges that are on different levels of the multi-level hierarchy, determining, as a convergence attribute or a convergence attribute range, an attribute or attribute range that is at a lower level of the multi-level hierarchy from among the different levels that the common attributes or common range of attributes are on, and controlling modification of the list based on the convergence attribute or convergence attribute range, the modification including at least one of: (i) newly-adding an object, which is not already included in the list and that has the convergence attribute or convergence attribute range, to the list, or (ii) deleting one of the objects from the list that has at least one of the common attributes or common attribute ranges that are on different levels, but does not have the convergence attribute or convergence attribute range, wherein the convergence attribute or the convergence attribute range is an attribute or an attribute range that one or more objects among the plurality objects have, the one or more objects were added to the list at a relatively later time among a plurality of times at which the respective plurality of objects were added to the list, the object that is to be newly-added to the list has already been accessed or viewed by the user, and the modification includes both of newly-adding and deleting.

* * * * *

UNITED STATES PATENT AND TRADEMARK OFFICE
CERTIFICATE OF CORRECTION

| | | |
|---|---|---|
| PATENT NO. | : 10,430,809 B2 | |
| APPLICATION NO. | : 14/900664 | |
| DATED | : October 1, 2019 | |
| INVENTOR(S) | : Daisuke Mochizuki | |

It is certified that error appears in the above-identified patent and that said Letters Patent is hereby corrected as shown below:

In the Claims

Column 26, Line 9; In Claim 1, Delete "objects object" and insert --object-- therefor Column 26, Line 52; In Claim 1, Delete "plurality objects" and insert --plurality of objects-- therefor Column 27, Line 17; In Claim 4, Delete "control code configured" and insert --control code is further configured-- therefor Column 27, Line 20; In Claim 4, Delete "range, to" and insert --range,-- therefor Column 27, Line 21; In Claim 4, Delete "the list, to be presented" and insert --to be presented-- therefor Column 27, Line 26; In Claim 5, Delete "range, which" and insert --range, and which-- therefor Column 27, Line 27; In Claim 5, Delete "the candidate is" and insert --the candidate, is-- therefor Column 27, Line 37; In Claim 6, Delete "hierarchy;" and insert --hierarchy; and-- therefor Column 27, Line 48; In Claim 6, Delete "hierarchy; and" and insert --hierarchy, and-- therefor Column 27, Line 49; In Claim 6, Delete "included the identified range" and insert --included in the identified range-- therefor Column 28, Line 15; In Claim 10, Delete "hierarchy;" and insert --hierarchy; and-- therefor Column 28, Line 26; In Claim 10, Delete "hierarchy; and" and insert --hierarchy, and-- therefor Signed and Sealed this
Twenty-first Day of April, 2020

Andrei Iancu
*Director of the United States Patent and Trademark Office*

Column 28, Line 28; In Claim 10, Delete "included the identified range" and insert --included in the identified range-- therefor Column 28, Line 38; In Claim 11, Delete "second object was added" and insert --second object being added-- therefor Column 28, Line 46; In Claim 12, Delete "objects object" and insert --object-- therefor Column 29, Line 16; In Claim 12, Delete "plurality objects" and insert --plurality of objects-- therefor